US007175738B2

(12) United States Patent
Lindsay et al.

(10) Patent No.: US 7,175,738 B2
(45) Date of Patent: Feb. 13, 2007

(54) AUTOMATED FOLD AND SEAL APPARATUS

(75) Inventors: Wayne R. Lindsay, Barrington, NH (US); Brett A. Lindsay, Somersworth, NH (US)

(73) Assignee: Bri-Lin, Incorporated, Rochester, NH (US)

(*) Notice: Subject to any disclaimer, the term of this patent is extended or adjusted under 35 U.S.C. 154(b) by 171 days.

(21) Appl. No.: 10/443,413

(22) Filed: May 22, 2003

(65) Prior Publication Data

US 2003/0201070 A1 Oct. 30, 2003

Related U.S. Application Data

(63) Continuation-in-part of application No. 09/849,936, filed on May 4, 2001, now Pat. No. 6,620,279.

(51) Int. Cl.
*B32B 37/00* (2006.01)
*B32B 38/00* (2006.01)
*F16C 13/00* (2006.01)

(52) U.S. Cl. .................. 156/442.1; 156/443; 156/555; 492/49; 492/53

(58) Field of Classification Search ................ 156/227, 156/442.1, 441.5, 442.2, 443, 555, 582, 290, 156/580, 538, 553; 493/216, 419, 420, 421, 493/243, 249, 267, 356–360; 425/368; 492/38–40, 492/48, 45, 49, 60
See application file for complete search history.

(56) References Cited

U.S. PATENT DOCUMENTS 3,796,423 A * 3/1974 Shuster ....................... 493/421
3,979,935 A * 9/1976 Edwards et al. ............. 72/12.3
4,288,067 A * 9/1981 Vigano' ....................... 493/420
4,650,454 A * 3/1987 Moll .......................... 493/442
4,875,965 A 10/1989 Marzullo ................. 156/442.1
4,974,782 A * 12/1990 Nelson ....................... 241/227
5,129,876 A * 7/1992 Brabant et al. ............. 493/471
5,180,151 A * 1/1993 Branecky et al. ............. 270/45
5,626,710 A 5/1997 Moll ....................... 156/477.1

(Continued)

FOREIGN PATENT DOCUMENTS

JP 2003-54164 * 2/2003

*Primary Examiner*—Melvin Mayes
(74) *Attorney, Agent, or Firm*—Davis & Bujold, P.L.L.C.

(57) ABSTRACT

A folding and sealing apparatus supporting a feed platform for feeding a supply of pre-glued forms to the folding and sealing apparatus. The housing accommodating a first roller, a second roller, a third roller and a fourth roller, and the first and second rollers forming a first nip, the second and third roller forming a second nip and the third and fourth roller forming a third nip. A motor drives at least one of the rollers via a drive mechanism. At least one of the rollers having a resilient portion to accommodate an object mounted on a form, passing through the nips while maintaining appropriate folding and sealing pressure on the supporting form to provide a sufficient sealing pressure to the folded form, as the folded form passes through the nips to facilitate both folding and sealing of the folded form. A cleaning arm is provided adjacent one of the rollers to remove debris therefrom, and a collection bin is provided adjacent the third nip for collecting the folded and sealed forms upon exiting from the folding and sealing apparatus.

18 Claims, 15 Drawing Sheets

U.S. PATENT DOCUMENTS 5,770,005 A * 6/1998 Staniszewski ............ 156/442.1
5,924,808 A * 7/1999 Sides, II ..................... 400/679
5,984,846 A * 11/1999 Hirschberg et al. ............ 492/6
6,162,316 A * 12/2000 Spitler et al. ............... 156/227
6,264,592 B1 7/2001 Lindsay ...................... 493/216
6,283,902 B1 * 9/2001 Bakoledis .................... 492/30
6,340,406 B1 1/2002 Parker et al. ............ 156/442.1
6,578,841 B2 * 6/2003 Salomon et al. ............ 271/109

* cited by examiner

AUTOMATED FOLD AND SEAL APPARATUS

This Application is a continuation-in-part of U.S. application Ser. No. 09/849,936, now U.S. Pat. No. 6,620,279, filed May 4, 2001.

FIELD OF THE INVENTION

The present invention relates to an automated apparatus which facilitates both folding and sealing of a pre-glued form by passing the pre-glued form through a plurality of pressure rollers to sequentially fold and seal the pre-glued form into a desired folded configuration.

BACKGROUND OF THE INVENTION

In the prior art, a variety of folding apparatuses are conventionally used and well known in the art for folding pre-glued forms. In addition, a variety of separate sealing apparatus are also conventionally used and well known in the art for sealing pre-glued forms. However, none of the heretofore known apparatuses facilitate both folding of a pre-glued form and sealing of a pre-glued form during a single pass of the form through a sealing and folding apparatus. Moreover, generally at least four rollers are required to facilitate folding of a pre-glued form while at least two additional rollers are required to facilitate sealing of the folded pre-glued form in its folded configuration.

With reference to FIGS. 1–3, the basic folding arrangement for three well known pre-glued forms 1 will be briefly discussed. Turning first to FIG. 1, the single folded configuration for the pre-glued form is shown. According to the single fold, a pre-glued form, which typically measures 8½ inches wide by either 11 inches, 14 inches or 17 inches long is folded. The pre-glued form is passed through a folding apparatus which folds, in a conventional fashion, the pre-glued form in half. A perimeter edge of a first surface of a top half 8 of the pre-glued form is provided with a first component of a pressure sensitive micro-encapsulated epoxy or adhesive 4 while a perimeter edge of the lower half 10 of the first surface is provided with a second mating component of a pressure sensitive micro-encapsulated epoxy or adhesive 6. Once the pre-glued and folded form is folded in half and then subjected to sufficient sealing pressure, the micro-encapsulated first and second components 4, 6 of the pressure sensitive epoxy or adhesive are released from their respective micro-capsules and mix and bonded with one another to seal the folded form in its folded in half configuration.

Turning now to FIG. 2, a second folded configuration, namely a Z-shaped fold will now be briefly discussed. According to this configuration, as with the previous embodiment, selected areas of opposed perimeter edge of a first surface of a top panel 12 of the pre-glued form 1 are provided with a first component of a pressure sensitive micro-encapsulated epoxy or adhesive 4 while selected areas of opposed perimeter side edge of an adjacent intermediate panel 14 on the same surface are provided with a second mating component of a pressure sensitive micro-encapsulated epoxy or adhesive 6. In addition, an opposed perimeter side edges of a rear surface of the intermediate panel 14 of the pre-glued form 1 is provided with a first component of a pressure sensitive micro-encapsulated epoxy or adhesive 4 or 6 while adjacent perimeter side edges of the lower panel 16 are provided with a second mating component of a pressure sensitive micro-encapsulated epoxy or adhesive 4 or 6. Once the pre-glued and folded form 1 is properly folded and subjected to a sufficient sealing pressure, the micro-encapsulated first and second components 4, 6 of a pressure sensitive epoxy or adhesive are released from their respective micro-capsules and mix and bonded with one another to seal the Z shaped form 1 in its folded configuration.

Turning now to FIG. 3, a third folded configuration, namely a letter type fold will now be briefly discussed. According to this configuration, as with the previous embodiment, opposed perimeter side edges of a top panel 8 of the front surface of the pre-glued form 1 and opposed perimeter side edges of a bottom panel 12 of the front surface of the pre-glued form 1 are both provided with a first component of a pressure sensitive micro-encapsulated epoxy or adhesive 4 while opposed perimeter side edges of an intermediate panel 10 of the front surface are provided with a second mating component of a pressure sensitive micro-encapsulated epoxy or adhesive 6. In addition, opposed perimeter side edges of a rear surface of either the top panel 8 or the bottom panel 12 of the pre-glued form 1 are provided with a second mating component of a pressure sensitive micro-encapsulated epoxy or adhesive 6. Once the pre-glued form 1 is properly folded and subjected to a sufficient sealing pressure, the micro-encapsulated first and second components 4, 6 of a pressure sensitive epoxy or adhesive are released from their respective micro-capsules and mix and bonded with one another to seal the Z shaped form 1 in its folded configuration.

With reference now to FIG. 4, a brief description concerning a prior art apparatus for folding one of the pre-glued form 1 described above will now be discussed. As can be seen in this Figure, the prior art folding apparatus 22 comprises four identically sized rollers 24, 26, 28 and 30 which are arranged to form three nips 32, 34 and 36 between each respective mating pair of the rollers. The first nip 32 is an intake nip which feeds the pre-glued form 1 to be folded from an infeed table or platform 38 to a fold channel tray which, in combination with the first nip and the second nip, facilitates formation of a first fold for the pre-glued form 1. As a leading edge of the folded pre-glued form 1 exits from the second nip 34, it is conveyed toward a second stop (not shown). As soon as the leading edge of the pre-glued form 1 abuts against the second stop, the pre-glued is stopped but the second nip continues to convey the pre-glued form 1 through the second nip 34 of the folding apparatus 22 and such conveyance feeds a trailing portion of the pre-glued form 1 into the third nip 36. As the trailing end portion of the pre-glued form 1 passes through the third nip 36, a second fold is made in the pre-glued form 1 and the third nip 36 conveys the pre-glued form 1 to a collection bin (not numbered) where the folded pre-glued form 1 is collected and subsequently sealed by a further separate sealing process.

By passing the pre-glued form 1 through the four rollers 24, 26, 28 and 30 and the three nips 32, 34, 36 formed therebetween, the two folds are made in the pre-glued form 1. It is to be appreciated that the second roller 26, however, is generally a fixedly positioned roller, i.e., the second roller 26 is fixedly mounted to housing and not spring biased in any manner, while the first roller 24, the third roller 28 and the fourth roller 30 are each spring biased toward one another to accommodate for the thickness of the pre-glued form 1 as it passes between one of the three nips 32, 34, 36. That is, the first roller 24 is spring biased toward the second roller 26 and is moved slightly away from the second fixed roller 26 as the pre-glued form 1 passes through the first nip 32, the third roller 28 is spring biased toward the second roller 26 and moves slightly away from the second roller 26 as the pre-glued form 1 passes through the second nip 34, and the fourth roller 30 is spring biased toward the third roller 28 and moves slightly away from the third roller 28 as the pre-glued form 1 passes through the third nip 36.

As will be appreciated from the above discussion, the folding apparatus, according to the prior art, is only able to provide a folded pre-glued form 1 and a separate further sealing operation, e.g. passing the folded pre-glued form 1 through a sealing apparatus, is required in order to finish production of the pre-glued form 1 in its completely folded and sealed configuration.

SUMMARY OF THE INVENTION

Wherefore, it is an object of the present invention to overcome the above mentioned shortcomings and drawbacks associated with the prior art folding and sealing apparatuses.

Another object of the present invention is to provide a single apparatus which provides both a folding operation and a sealing operation to a pre-glued form during a single pass of the pre-glued form through the apparatus.

A further object of the present invention is to minimize the amount of associated rollers required to facilitate both the folding operation and the sealing operation of the pre-glued form as pre-glued form makes a single pass through the apparatus.

Still another object of the present invention is to provide a first and second fixed nips to provide a sufficient sealing pressure to the folded pre-glued form as the pre-glued form makes a single pass through the fixed nips of the apparatus.

A still further object of the present invention is to utilize at least three stainless steel rollers, or some other material which is substantially incompressible, as the final three pressure rollers of the folding and sealing apparatus to provide a sufficient sealing pressure to the pre-glued form.

Yet another object of the present invention is to arrange four rollers so as to form three nips between a mating surface of the four rollers, with the first and second nips cooperating with one another to provide a first initial fold for the pre-glued form while the second and third nip cooperating with one another to provide a second fold for the pre-glued form and the second and third nips providing a sufficient sealing pressure to the pre-glued form to facilitate sealing of the folded pre-glued form.

The present invention also relates to a folding and sealing apparatus comprising: a housing, the housing accommodating a plurality of rollers, the housing accommodating a motor for driving at least one of the plurality of rollers via a drive mechanism, a feed surface, supported by the housing, for feeding a supply of pre-glued forms to the folding and sealing apparatus, wherein the plurality of rollers form at least two nips each having a fixed nip clearance and the two fixed nips provide a sufficient sealing pressure to the folded pre-glued form, as the pre-glued form passes through the two fixed nips, to facilitate both folding and sealing of the pre-glued form as the folded pre-glued form passes through the two fixed nips.

The present invention also relates to a method of folding and sealing a pre-glued form by a single pass through a folding and sealing apparatus, the method comprising the steps of: providing a housing, accommodating a plurality of rollers within the housing, accommodating a motor, for driving at least one of the plurality of rollers via a drive mechanism, within the housing, providing a feed surface, supported by the housing, for feeding a supply of pre-glued forms to the folding and sealing apparatus, forming, via the plurality of rollers, at least two nips each having a fixed nip clearance and the two fixed nips providing a sufficient sealing pressure to the folded pre-glued form, as the pre-glued form passes through the two fixed nips, and facilitate both folding and sealing of the pre-glued form as the folded pre-glued form passes through the two fixed nips.

BRIEF DESCRIPTION OF THE DRAWINGS

The invention will now be described, by way of example, with reference to the accompanying drawings in which.

DESCRIPTION OF THE PREFERRED EMBODIMENTS

Figure 3:
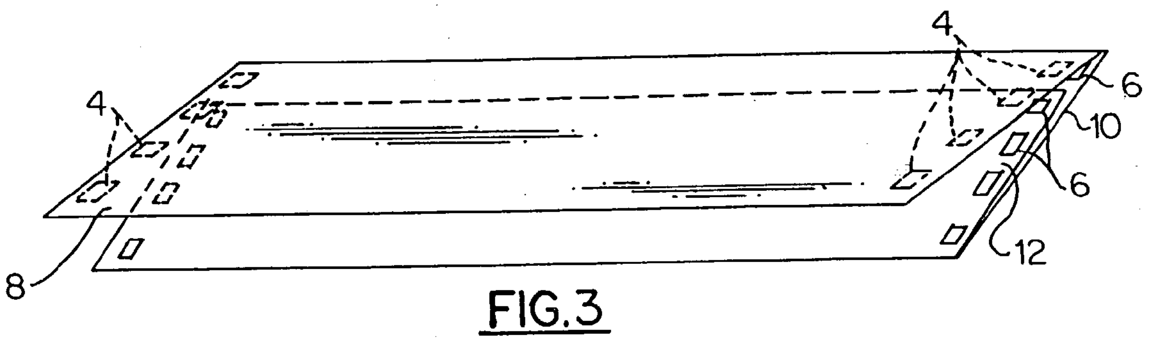
FIG. 3 is a diagrammatic perspective view showing the partially folding configuration for a letter type folded pre-glued form.
Figure 1:
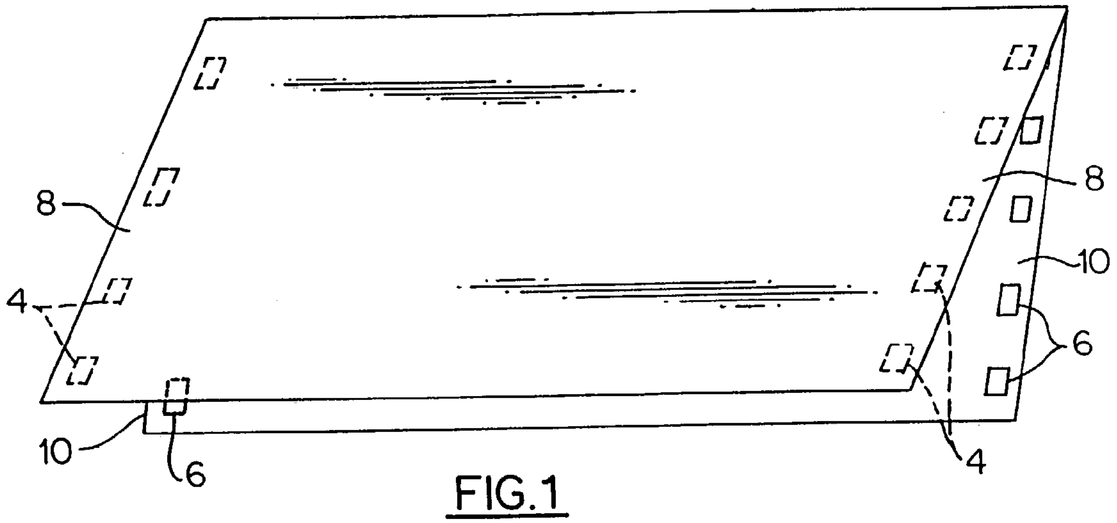
FIG. 1 is a diagrammatic perspective view showing the partially folding configuration for a single folded pre-glued form.
Figure 2:
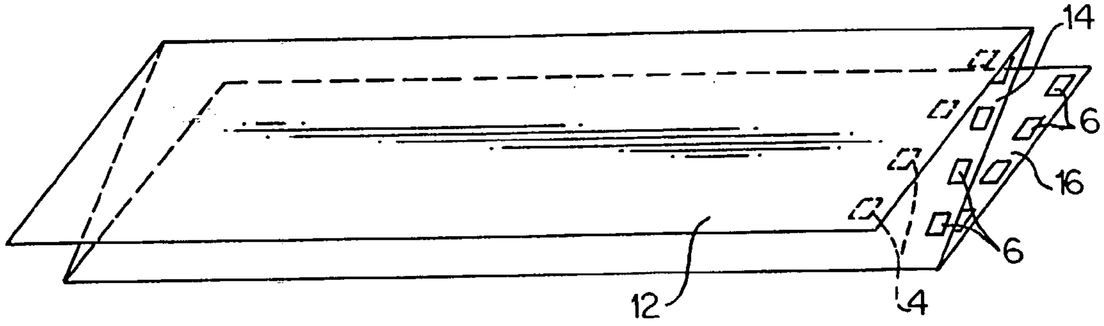
FIG. 2 is a diagrammatic perspective view showing the partially folded configuration for a Z-shaped folded pre-glued form.
Figure 4:
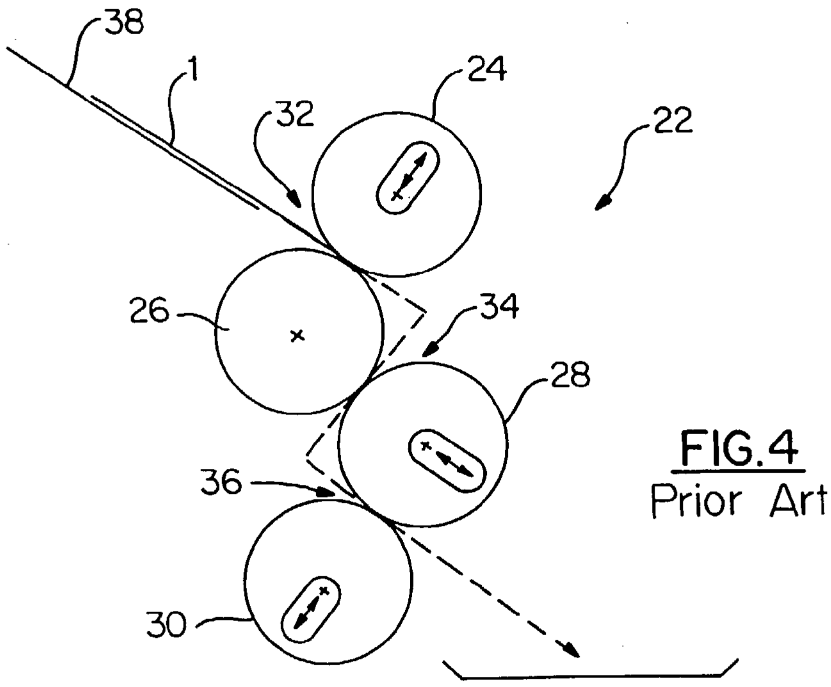
FIG. 4 Prior Art
FIG. 4 is a diagrammatic section view showing a prior art apparatus for folding of a pre-glued form.
Figure 5:
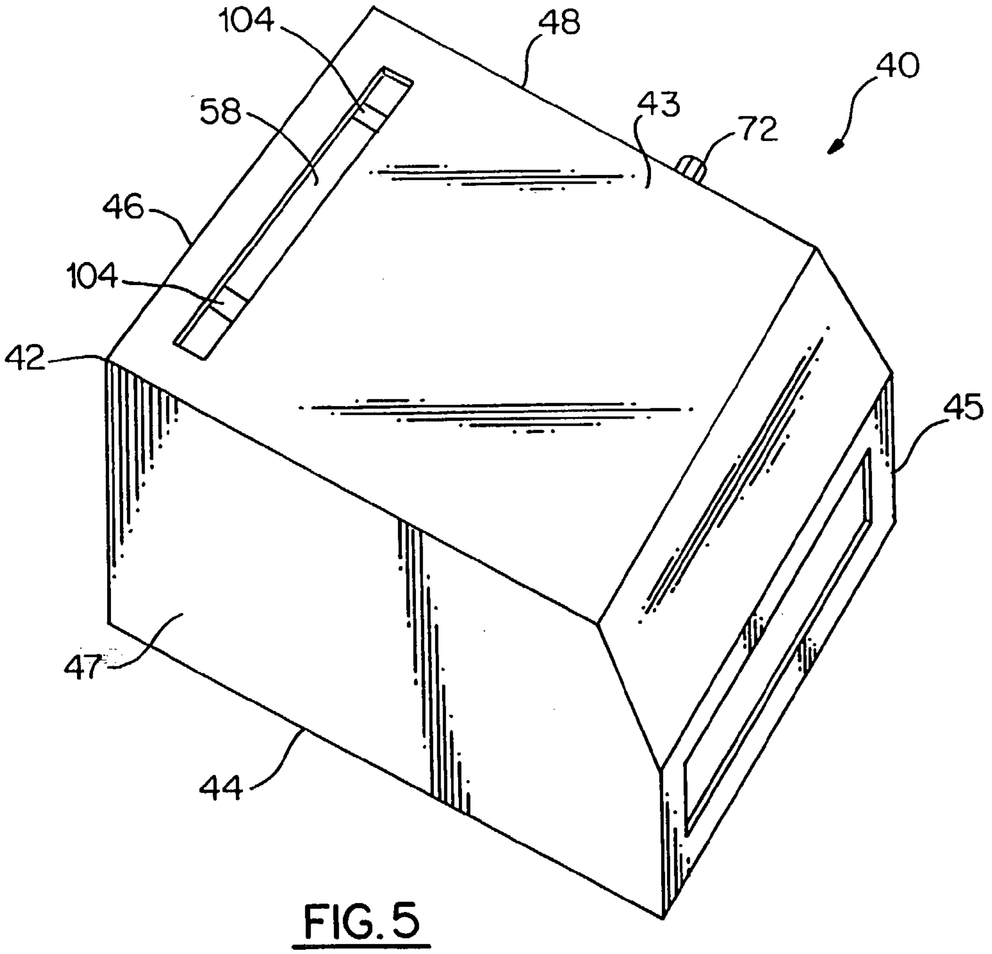
FIG. 5 is a diagrammatic perspective view of the folding and sealing apparatus according to the present invention.

With reference now to FIGS. 5–11, and FIGS. 5–7 in particular, a first embodiment of the folding and sealing apparatus, according to the present invention, will now be discussed in detail. The folding and sealing apparatus 40 generally comprises an exterior housing 42 having a top wall 43 and a bottom wall 44, a pair of opposed end walls 45, 46, and a pair of opposed sidewalls 47, 48 which each support one end of a first roller 50, a second roller 52, a third roller 54 and a fourth roller 56, as will be described in further detail below. In addition, the folding and sealing apparatus 40 includes a feed cassette, feed platform, feed table or feed tray, generally designated as 58, for feeding a supply of pre-glued forms 1, to be folded, to the folding and sealing apparatus 40 as well as a collection bin, generally designated as 60, for collecting the completely folded and sealed pre-glued forms 1 once they pass through and exit the folding and sealing apparatus 40. If desired, a conveyor (see FIG. 11) may be provided, instead of the collection bin 60, for receiving the folded forms 1 as they are discharged from the outlet of the folding and sealing apparatus 40 and transport the folded forms 1 to another area for further processing.

As with the prior art, the four rollers 50, 52, 54 and 56 are all located and completely housed within the exterior housing 42 of the folding and sealing apparatus 40 for safety reasons. However, contrary to the prior art, the second, the third and the fourth rollers 52, 54 and 56 of the folding and sealing apparatus 40 are all fixedly supported or arranged rollers (i.e., the position and orientation of these rollers are preset at the manufacturing facility to maintain continuously a desired spacing between the respective rollers and eliminate any adjustment of the roller position(s) which typically is done by the operator of conventional fold and seal while the other remaining roller, i.e., the first roller 50 of the folding and sealing apparatus 40, is a spring biased roller which can separate slightly from its spring biased position when a pre-glued form 1 passes between the first roller 50 and the second roller 52. That is, the first roller 50 is spring biased toward the second roller 52 which is fixedly supported by a pair of opposed bearings (not numbered) mounted on the opposed side walls 47, 48 of the exterior housing 42. The pair of bearings facilitate rotation of the second roller 52. In a similar manner, the third and the fourth rollers 54 and 56 are also fixedly supported by a pair of opposed bearings (not numbered) mounted on the opposed side walls 47, 48 of the exterior housing 42. The two pairs of bearings (not numbered) facilitate rotation of the third and the fourth rollers 54 and 56. A first nip 51 is formed between the first and second rollers 50, 52, a second nip 53 is formed between the second and third rollers 52, 54, and a third nip 55 is formed between the third and fourth rollers 54, 56.

Figure 6:
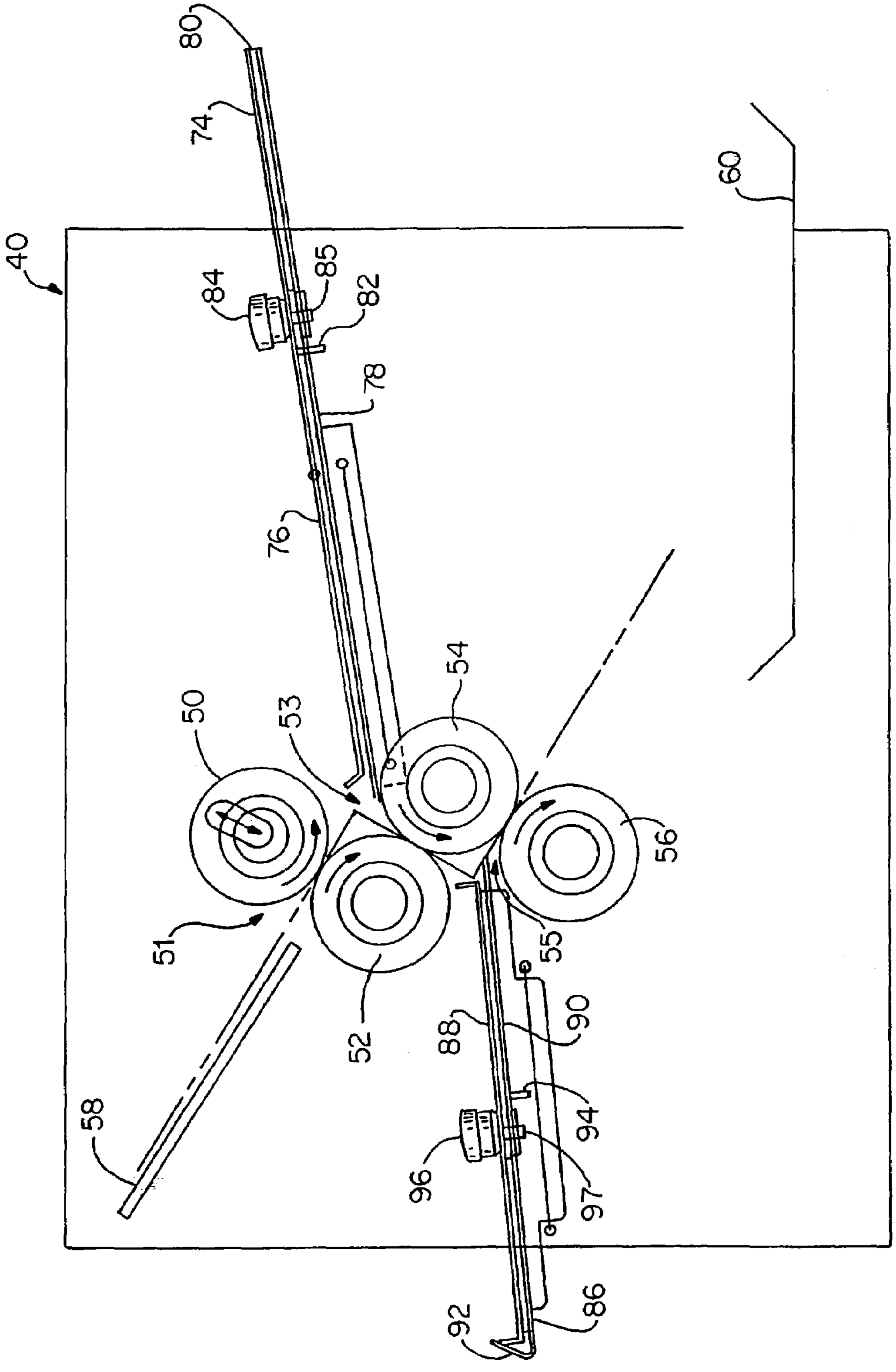
FIG. 6 is a diagrammatic cross section view showing the basic components of the folding and sealing apparatus of FIG. 5.
Figure 7:
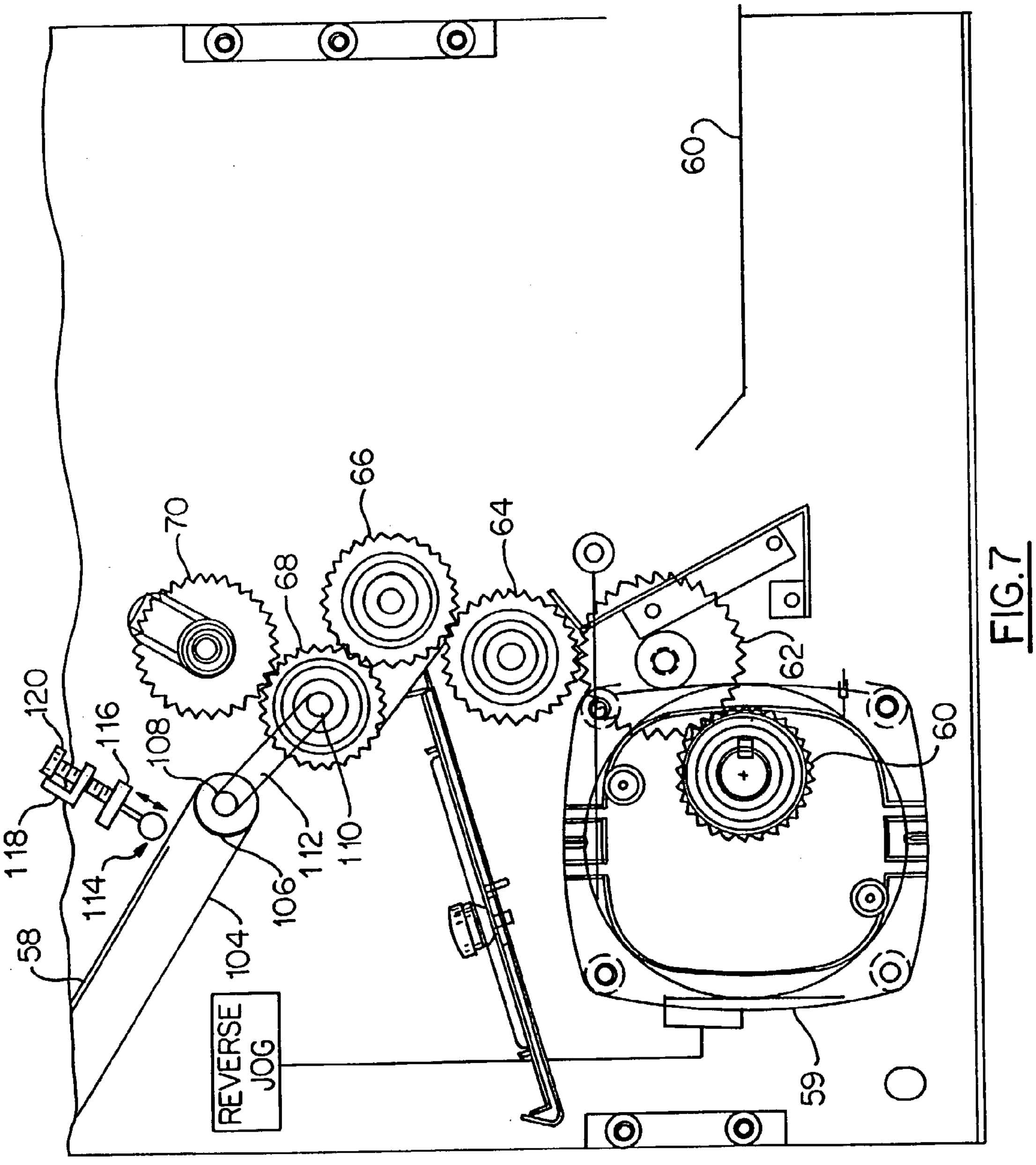
FIG. 7 is a diagrammatic cross section view showing the drive components of the folding and sealing apparatus of FIG. 5.
Figure 8:
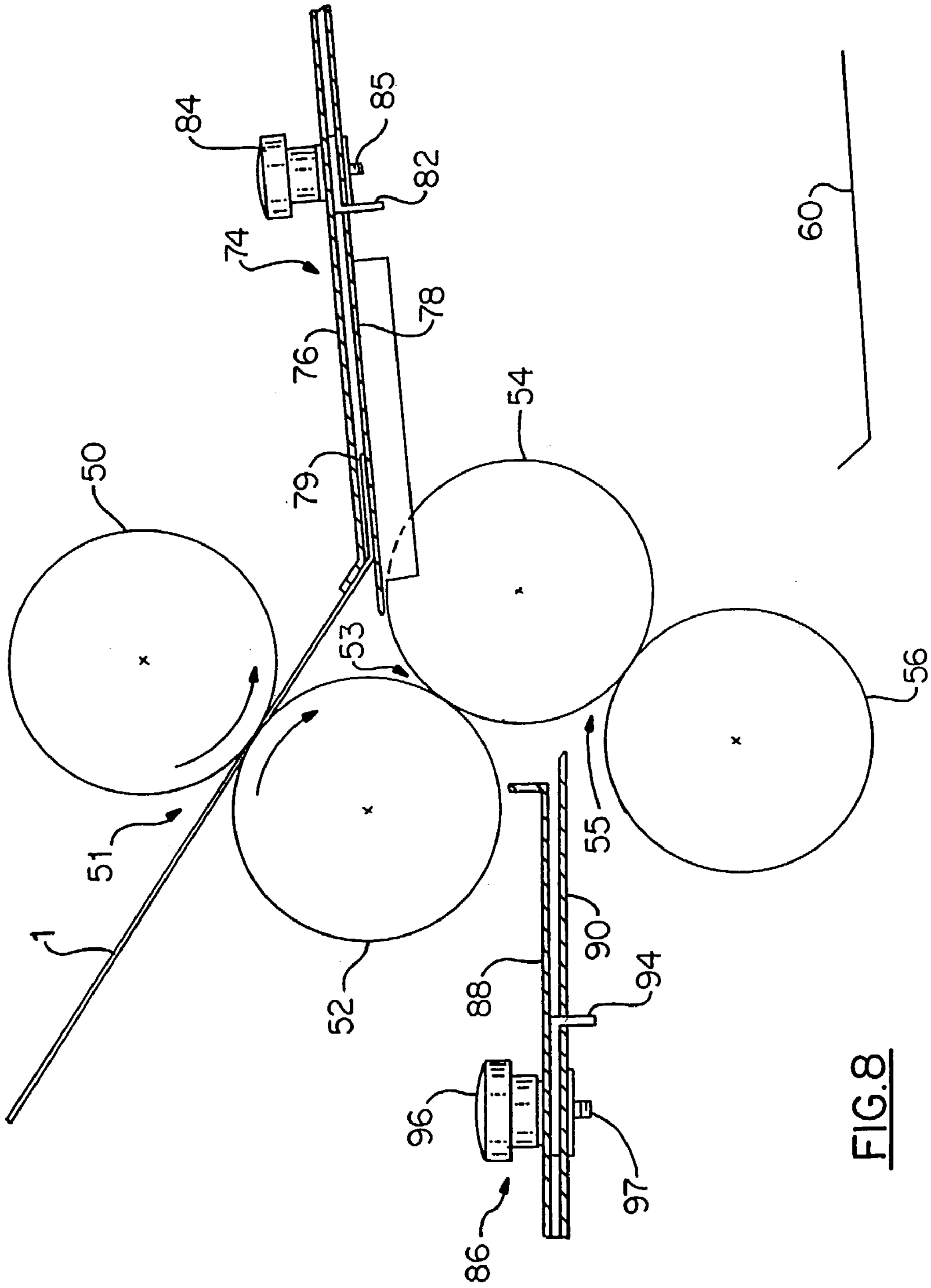
FIG. 8 is a diagrammatic cross-sectional view of the folding and sealing apparatus of FIG. 6 showing a first phase of the folding sequence for folding a pre-glued form.
Figure 9:
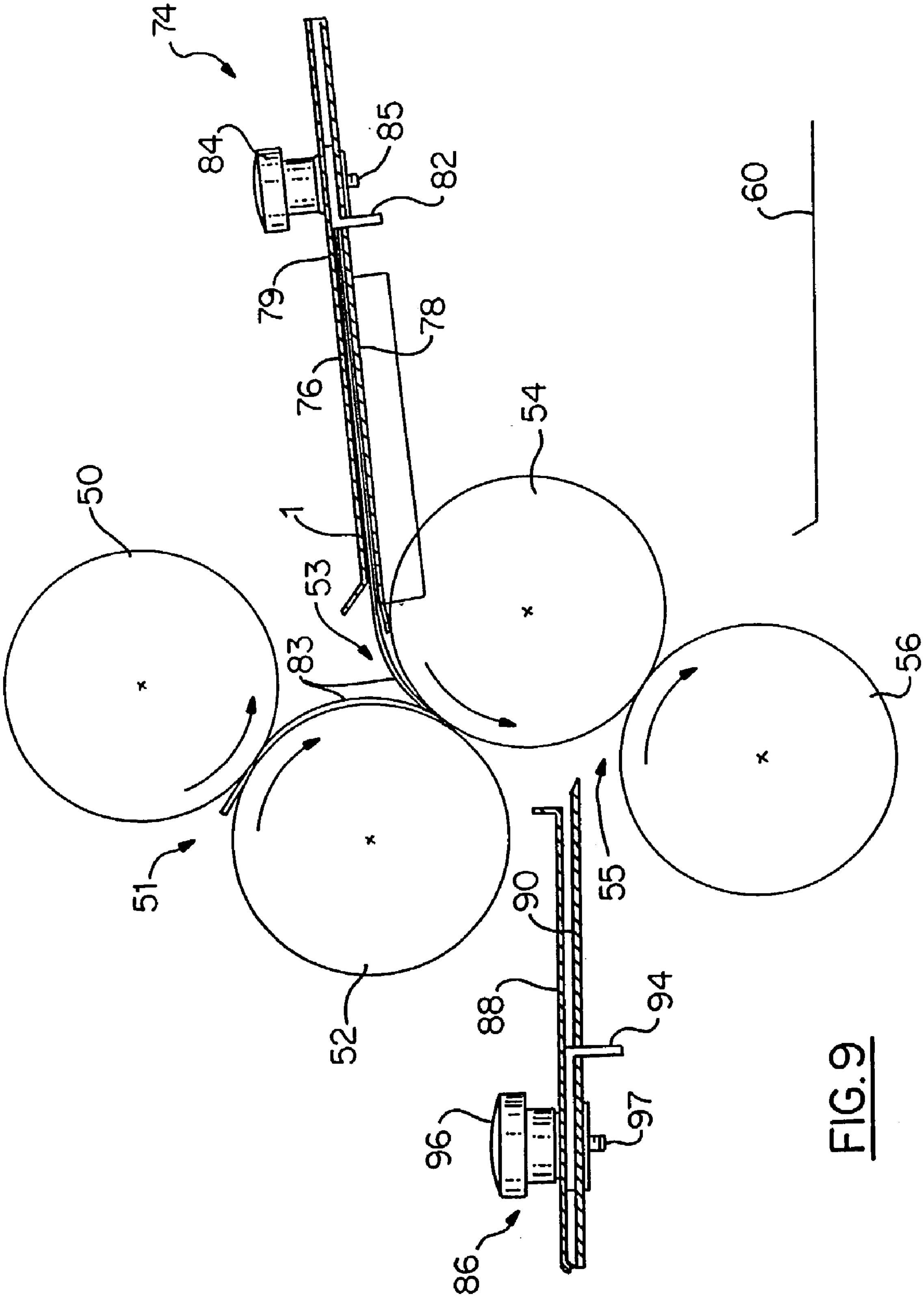
FIG. 9 is a diagrammatic cross-sectional view of the folding and sealing apparatus of FIG. 6 showing a second phase of the folding sequence for folding a pre-glued form.

A single motor 59 drives the first roller, the second roller, the third roller and the fourth roller 50, 52, 54 and 56 via a series of gears. An output shaft (not numbered) of the motor supports a first gear 60 and this first gear 60 directly drives an intermediate gear 62. The intermediate gear 62, in turn, directly drives a fourth gear 64 supported at one end of the fourth roller 56, adjacent one of the bearings, so as to rotate the fourth roller 56 in a clockwise direction (as can be seen in FIG. 6). The fourth gear 64 is also coupled to directly drive a third gear 66 supported at one end of the third roller 54, adjacent one of the bearings, so as to rotate the third roller 54 in a counterclockwise direction (as can be seen in FIG. 6). The third gear 66 is, in turn, directly coupled to a second gear 68 supported by one end of the second roller 52, adjacent one of the bearings, so as to rotate the second roller 52 in a clockwise rotation (as can be seen in FIG. 6). The second gear 68 is, in turn, directly coupled to a first gear 70 supported at one end of the first roller 50, adjacent one of the bearings, so as to rotate the first roller 50 in a counterclockwise rotation (as can be seen in FIG. 6). It is to be appreciated, that due to the gearing of the present invention, all of the four rollers 50, 52, 54 and 56 rotate simultaneously with one another and at constant and identical rotational speeds. Preferably, the first, the second, the third and the fourth rollers 50, 52, 54 and 56 all rotate at a rotational speed of between 40 to about 1200 revolutions per minute and more preferably rotation at a rotational speed of about 300 revolutions per minute during normal operation of the folding and sealing apparatus 40.

The motor 59 supplies a sufficient rotating torque to the third and fourth rollers 54, 56 to facilitate passing the pre-glued and folded form 1 therethrough and minimize the possibility of the third and fourth pressure rollers 54, 56 from becoming bound or jammed as a folded form 1 passes therethrough. The motor 59 is designed to provide a torque to the third nip 55, formed between the third and fourth rollers, 54, 56 and to the second nip 53, formed between the second and third rollers 52, 54, of about 60 to 90 inch pounds of torque. The motor 59 is preferably at least ⅓ to ¼ horsepower motor and is coupled to an electrical supply by either a conventional electrical cord or a conventional battery (not shown).

The second, the third and the fourth rollers. 52, 54 and 56 are all preferably stainless steel rollers or rollers which are manufactured from some other material which has a substantially incompressible exterior surface so that a sufficient folding/sealing pressure is applied to the pre-glued form 1 as the form passes through the second nip 53 formed between the second and third rollers 52, 54 and as the pre-glued form 1 as the form passes through the third nip 55 formed between the third and fourth rollers 54, 56. It is to be appreciated that the first roller 50 can also be a stainless steel roller or manufactured from some other material which has a substantially incompressible exterior surface.

Preferably, the second and the third rollers 52 and 54 are spaced from one another by a distance of about 0.004±0.0005 inches so as to form a second nip 53 having a constant and uniform spacing along the entire elongate axial length of the second nip 53 and the third and fourth rollers 54 and 56 are likewise spaced from one another by a distance of about 0.004±0.0005 inches so as to form a third nip 55 having a constant and uniform spacing along the entire elongate length of the third nip 55. It is to be appreciated that the second and the third nips 53, 55, in order to provide the necessary folding and/or sealing pressure, must be substantially fixed nips, i.e., the spacing between the two the second and the third roller 52 and 54 and between the third and the fourth pressure rollers 54 and 56 must not change during operation, as the pre-glued and folded form 1 passes therethrough, so that a sufficient sealing pressure is generated on the pre-glued and folded form 1 so as to break the micro-capsules containing the first and second components of the pressure sensitive epoxy or adhesive 4 and 6 and adequately bond and seal the folded form 1.

In order to minimize damage and/or required service calls for the folding and sealing apparatus 40, it is desirable to provide at least one of the fixed rollers, either the second, the third and/or the fourth roller 52, 54 or 56 or possibly two or more of those rollers, with a release mechanism 72 (FIG. 5), e.g. a ⅝ inch hex head provided on an end of a shaft supporting one of the rollers, e.g. third roller 54. In the event that the folding and sealing apparatus 40 becomes bound or jammed, for some reason, as one of the pre-glued and folded forms 1 passes through the second or third nip 53 or 55, an operator may obtain and place a wrench on the release mechanism 72 and manually turn or rotate the bound rollers in either a forward direction or a reverse direction to remove the jammed pre-glued and folded form 1 and unbind the folding and sealing apparatus 40. By providing the operator of the folding and sealing apparatus 40 with the ability to rotate the third and fourth rollers manually, this minimizes the possibility of the operator having to call a maintenance person to maintain the folding and sealing apparatus 40 in a peak operating condition. In addition, the motor 59 may be electrically coupled to a control panel equipped with "reverse jog" button which reverses the drive direction of the motor 59 to facilitating freeing the jammed pre-glued and folded form 1 from the pair of rollers and unbind the folding and sealing apparatus 40.

A first fold channel tray is provided along a travel path between the first and second nips 51 and 53. The first fold channel tray 74 comprises a top tray wall 76, an opposed bottom tray wall 78, a pair of opposed side tray walls (not numbered) and an end tray wall 80. The first fold channel tray 74 is sized to accommodate an 8½ inch wide sheet of paper, i.e., the opposed tray side walls are spaced from one another by a distance slightly greater than 8½ inches. The top tray wall 76 is spaced from the bottom tray wall 78 typically by a distance of about 1/16 of an inch to about ½ of an inch or so to provide a sufficient area for receiving a leading edge 79 of the pre-glued form 1. A first adjustable fold stop 82 is accommodated by the first fold channel 74 and the adjustable fold stop 82 is axially movable along the length of the first fold channel 74, as discussed below in further detail, to a desired position.

In addition, the folding and sealing apparatus 40 includes a second fold channel tray 86 provided along a travel path between the second and third nips 53 or 55. The second fold channel tray 86 also comprises a top tray wall 88, an opposed bottom tray wall 90, a pair of opposed side tray walls (not numbered) and an end tray wall 92. The second fold channel tray 86 is also sized to accommodate an 8½ inch wide sheet of paper, i.e., the opposed tray side walls are spaced from one another by a distance greater than 8½ inches. The top tray wall 88 is spaced from the bottom tray wall 90 typically by a distance of about 1/16 of an inch to about ½ of an inch or so to provide a sufficient area for receiving the leading edge 79 of the pre-glued and partially folded form 1. Another adjustable fold stop 94 is accommodated by the second fold channel 86 and the adjustable fold stop is axially movable along the length of the second fold channel, as discussed below in further detail, to a desired position.

The first and second adjustable fold stops 82, 94, of the first and the second fold channel trays 74, 86, are each movable axially along the length of the respective fold channel trays by as distance between 0 to 15 inches depending on the length of the document to facilitate adjustment of the width of the fold of the form 1 to be achieved by the respective fold channel tray 74, 86. To facilitate such adjustment, the top surface 76, 88 of each fold channel tray has at least one elongate aperture or slot (not shown) formed therein which allows a projecting screw 85 or 97, carried by an adjustable knob 84 or 96, to pass therethrough. The projecting screws 85 or 97 each engage with a mating threaded nut (not numbered) provided on the adjustable fold stops 82, 94 and, once the respective nut is sufficiently tightened, the nut maintains the adjustable fold stops 82, 94 in a desired adjusted location.

Due to this arrangement, an operator can adjust the length of the fold to be made in the form 1 to be folded by loosening the knobs 84, 96, moving the adjustable fold stop(s) 82 or 94 axially along the fold channel tray 74, 86 to a desired location and then re-tightening the adjustable fold stop 82, 94 at that desired position by a tightening rotation of the knobs 84, 96. The length of the first fold for the pre-glued form 1 is determined by the distance from the facing surface of the first adjustable stop 82, of the first fold channel tray 74, to the second nip 53 while the length of the second fold for the pre-glued form 1 is determined by the distance from the facing surface of the second adjustable stop 94, of the second fold channel tray 86, to the third nip 55.

When folding of a pre-glued form 1 is wanted, a desired supply of the pre-glued form(s) 1 to be folded and sealed is placed on the in-feed table or platform 58. Thereafter, the folding and sealing apparatus 40 is activated and a leading edge 79 of the pre-glued form 1 is fed, by the first and second rollers 50, 52, into the first nip 51. The leading edge 79 of the pre-glued form 1 exits from the first nip 51 and the first and second rollers 50 (FIG. 8), 52 continue feeding the pre-glued form 1 until the leading edge 79 of the pre-glued form 1 contacts the first adjustable fold stop 82 of the first fold channel tray 74. Once this occurs (FIG. 9), continued feeding rotation of the first and second rollers 50, 52 causes an intermediate leading portion 83 of the pre-glued form 1 to accumulate in an area located immediately adjacent the second nip 53, formed between the second and third rollers 52, 54.

Once a sufficient amount of the intermediate leading portion 83 of the pre-glued form 1 has accumulated in the area immediately adjacent the second nip 53, the clockwise rotation of the second roller 52 and the counterclockwise rotation of the third roller 54 cause the intermediate leading portion 83 of the pre-glued form 1 to enter the second nip 53 and form a first fold in the pre-glued form 1 as intermediate leading portion 83 passes through the second nip 53. In addition, as the second and third rollers 52, 54 are both fixedly mounted rollers, those two rollers are not biased away from one another, as the pre-glued form 1 passes through the second nip 53, and thus the second and third rollers 52, 54 also apply a sufficient contact pressure to the pre-glued form 1 so as to seal, at least partially, the pre-glued form 1 in its partially folded configuration as the pre-glued form 1 passes through the second nip 53.

Figure 10:
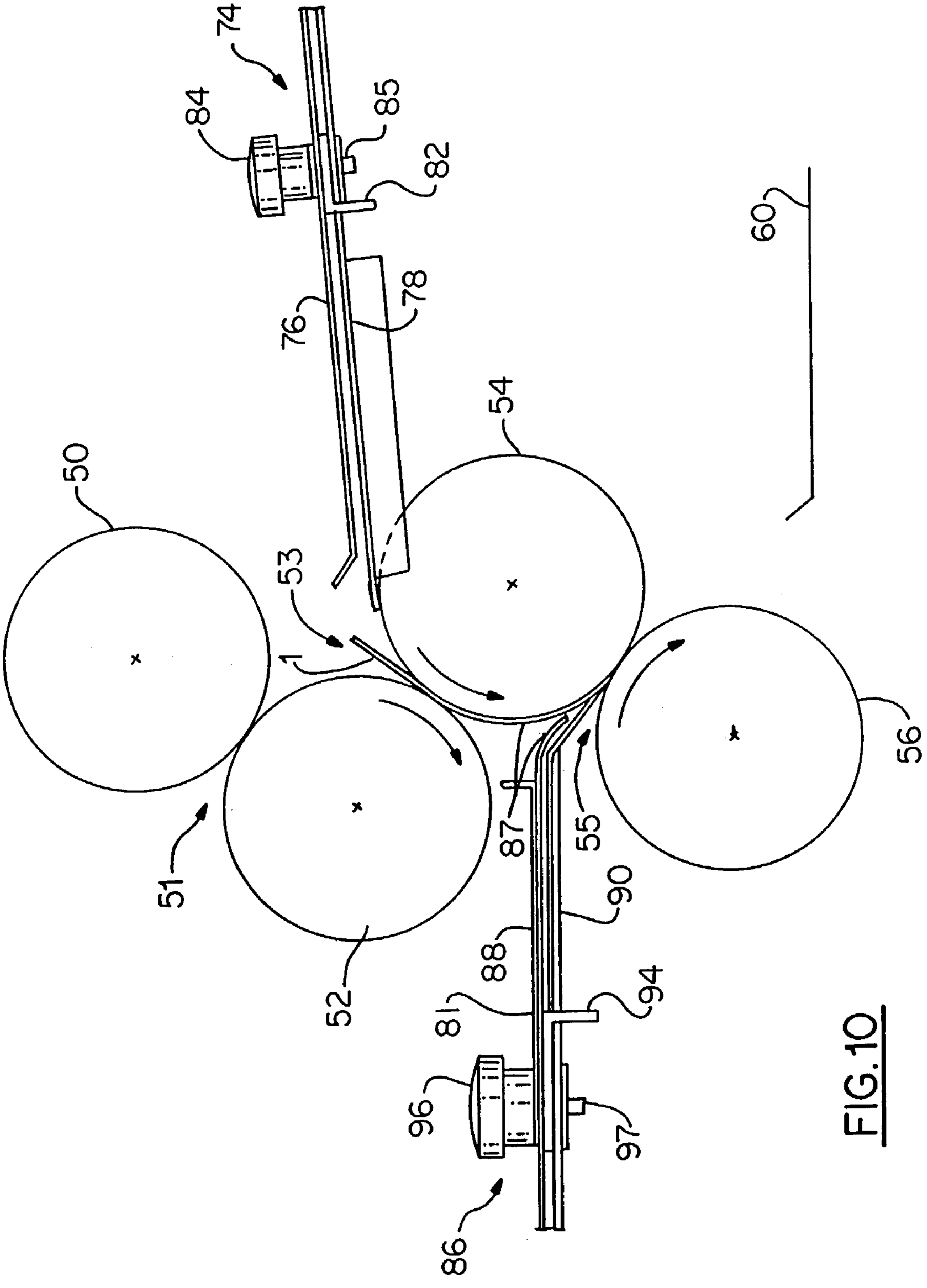
FIG. 10 is a diagrammatic cross-sectional view of the folding and sealing apparatus of FIG. 6 showing a third phase of the folding sequence for folding a pre-glued form.
Figure 11:
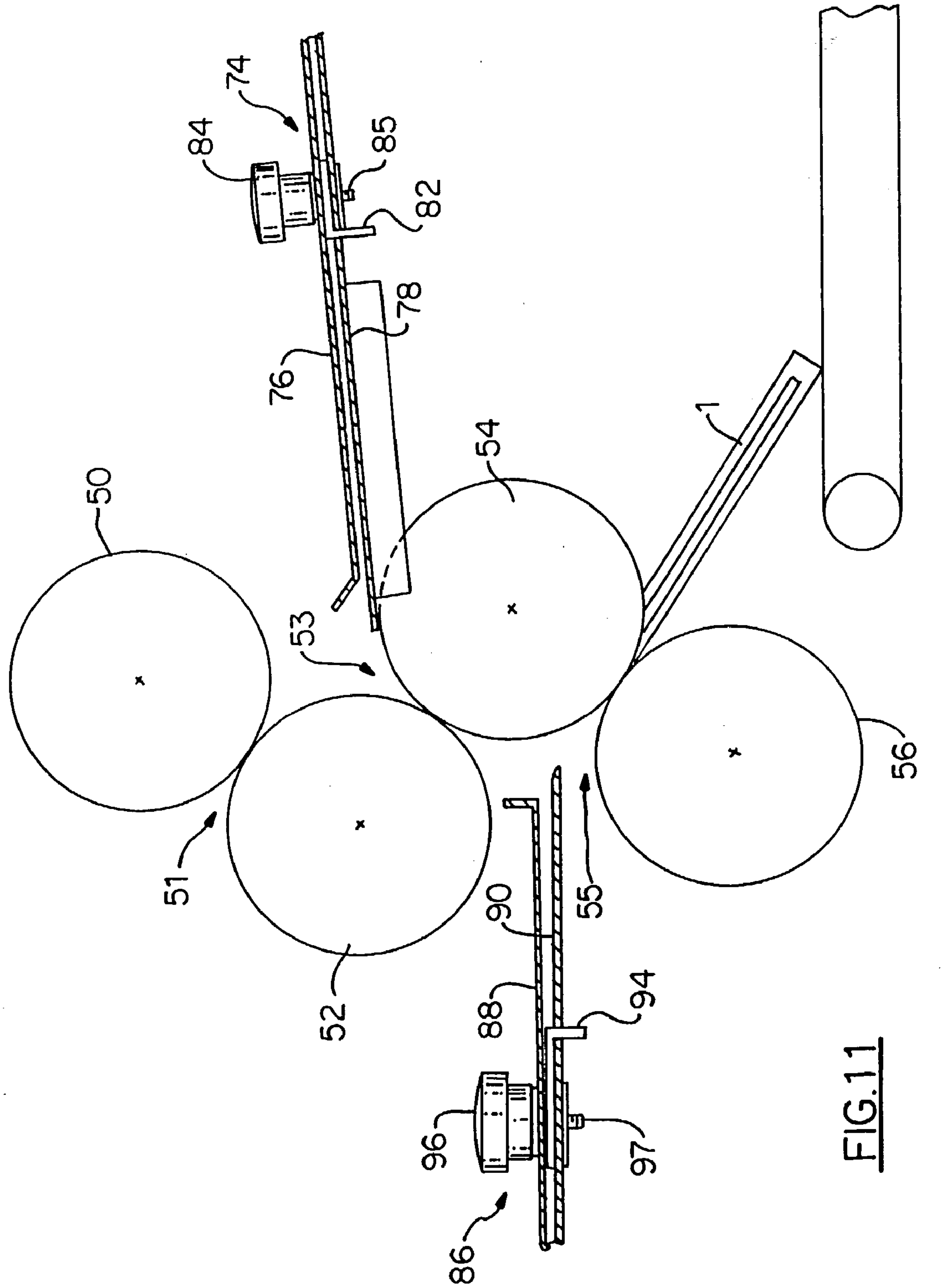
FIG. 11 is a diagrammatic cross-sectional view of the folding and sealing apparatus of FIG. 6 showing a fourth phase of the folding sequence for folding a pre-glued form with a conveyor substituted in place of the collection bin.

A leading folded edge 81 of the partially folded pre-glued form 1 exits the second nip 53 and is conveyed, due to the clockwise rotation of the second roller 52 and the counterclockwise rotation of the third roller 54, toward the second adjustable stop 94 of the second fold channel tray 86 (FIG. 10). Once the leading folded edge 81 of the pre-glued form 1 contacts the second adjustable fold stop 94, the pre-glued form 1 is prevented from further advancement within the second fold channel tray 86 and thus a trailing intermediate portion 87 of the pre-glued form 1 begins to accumulate in an area immediately adjacent the third nip 55, formed between the third and fourth rollers 54, 56. After a sufficient amount of the trailing intermediate portion 87 of the pre-glued form 1 has accumulated in the area immediately adjacent the third nip 55, the counterclockwise rotation of the third roller 54 and the clockwise rotation of the fourth roller 56 cause the trailing intermediate portion 87 of the pre-glued form 1 to enter the third nip 55 and form a second fold in the pre-glued form 1 as the pre-glued form 1 passes through the third nip 55. In addition, as the third and fourth rollers 54, 56 are both fixedly mounted rollers, those two rollers are not biased away from one another, as the pre-glued form 1 passes through the third nip 55, and thus the third and fourth rollers 54, 56 also apply a sufficient contact pressure to the pre-glued form 1 so as to completely seal the pre-glued form 1 in its folded configuration as the pre-glued form passes through the third nip 55. When the pre-glued and folded form 1 exits the third nip 55, it is collected in a collection bin 60 for further handling or processing by the operator.

In the event that only a half fold is required, the second fold channel tray 86 is removed from the housing, rotated or turned around 180° and then reinserted back into the housing 42, end tray wall 92 first, so that a rear surface of the end tray wall 92 of the second fold channel tray 86 is located closely adjacent and between both the second and fourth rollers 52 and 56 to deflect and redirect the partially folded pre-glued form 1, as the pre-glued form 1 exits from the second nip 53, toward the third nip 55.

When folding of a pre-glued form 1 is wanted, a desired pre-glued form 1 to be folded and sealed is placed on the in-feed table or platform 58 and the pre-glued forms 1 each pass through the first and second nips 51 and 53 in the same manner discussed above. However, due to the reverse configuration of the second fold channel tray 86, as the leading folded edge 81 of the partially folded pre-glued form 1 exits the second nip 53, formed by the second and third rollers 52, 54, the leading folded edge 81 of the partially folded pre-glued form 1 contacts the adjacent facing rear surface of the second fold channel tray 86 and is deflected by that surface directly toward and into the third nip 55 formed between the third and fourth rollers 54, 56. Accordingly, only a single fold is provided to the pre-glued form 1 and, as the folded pre-glued form 1 passes through the third nip 55, a further sealing pressure is provided to the folded pre-glued form 1 to seal further the pre-glued form 1 in its previously folded configuration.

As will appreciated by the above discussion, by merely reversing the orientation of the second fold channel tray 86, only a single fold is automatically provided by the same folding and sealing apparatus 40. Preferably the first fold channel tray 74 is also releasably secured to and retained by the housing 42 of the folding and sealing apparatus 40 to facilitate reversal thereof in the same manner as the second fold channel tray 86.

Figure 12:
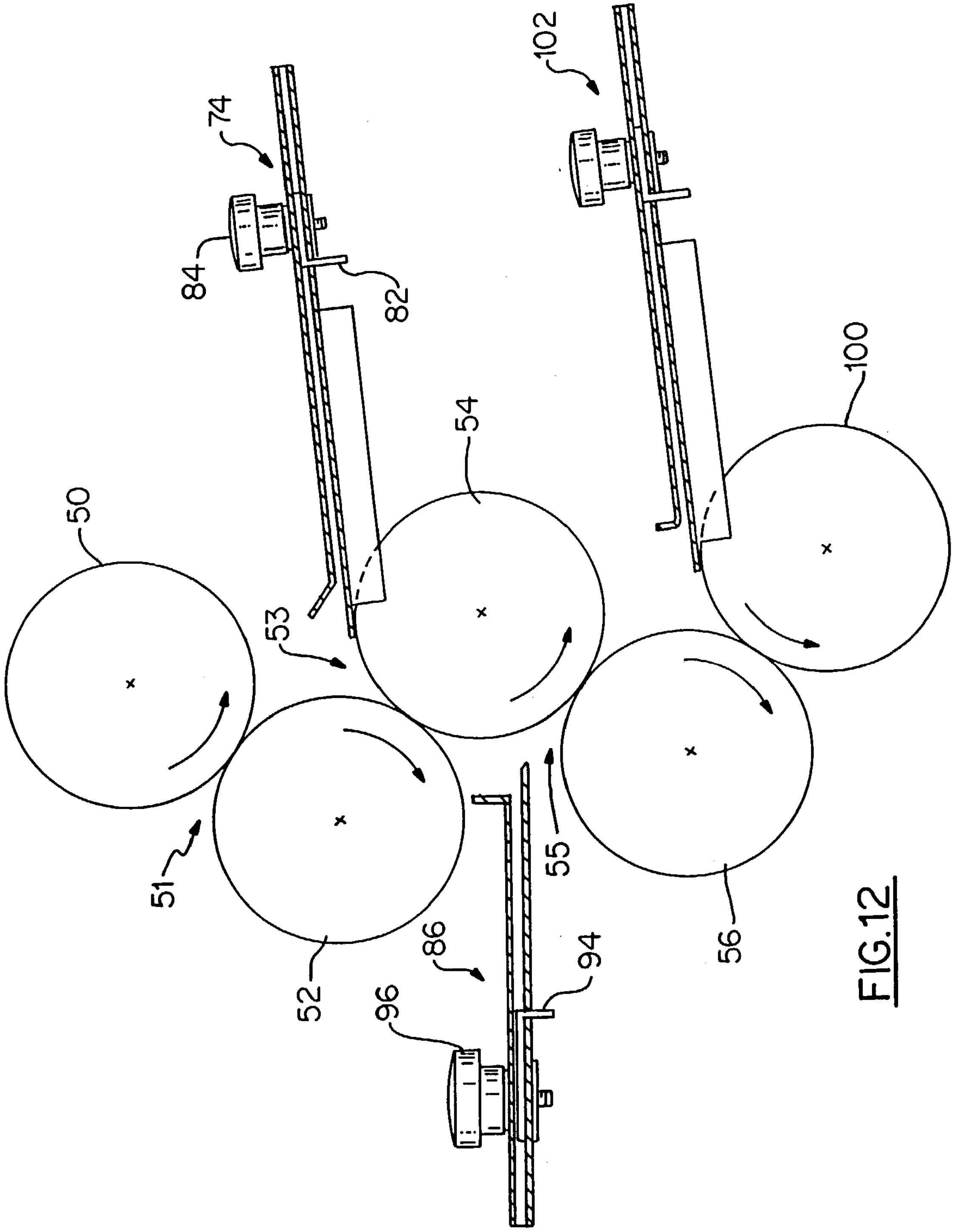
FIG. 12 is a diagrammatic cross section view showing the basic components of a second embodiment of the folding and sealing apparatus according to the present invention.

With reference now to FIG. 12, a second embodiment of the present invention will now be briefly discussed. As this embodiment is very similar to the previous embodiment, only a detailed discussion concerning the differences between this embodiment and the previous embodiment will be provided. The major difference between this embodiment and the previous embodiment is the addition of one additional fixed roller, e.g. a fifth roller 100, and one additional fold channel tray 102. By the addition of a further fixed roller 100 and a further fold channel tray 102, the folding and sealing apparatus 40, according to the present invention, is able to provide a third fold to the pre-glued form 1 during a single pass of the pre-glued form 1 through the folding and sealing apparatus 40. The fifth roller 100 is supported by a pair of opposed bearings (not numbered) mounted on the opposed side walls 47, 48 of the exterior housing 42 and the fifth roller 100 is fixedly spaced from the fourth roller 56. A fifth gear (not shown), supported at one end of the fifth roller 100, adjacent one of the bearings (not shown), is driven by the intermediate gear 62 in a counter clockwise direction and the fifth gear drives the fourth gear 64 at the same rotational speed and in a similar manner to the other four rollers 50, 52, 54 and 56 and the third fold channel tray 102 is substantially identical in function and operation to the first and second fold channel trays 74, 86. It is to be appreciated that, depending upon the final amount of folds to be provided to the pre-glued form 1, the number of rollers and associated fold channel trays can be increased, as necessary, and such modification would be readily apparent to those skilled in this art.

When the pre-glued form 1 is folded over in half, the thickness of the form generally measures between about 0.005 to about 0.015, depending upon the thickness of the paper utilized to manufacture the pre-glued form 1, while when the form is folded over into the Z-shaped or letter type configuration, the folded pre-glued form 1 has a thickness ranging from about 0.009 to about 0.020 or more. By providing a clearance for the second and third nips 53, 55 of only about 0.004±0.0005, according to the present invention, a suffic provided to the pre-glued form 1 to insure that the micro-capsules, containing the pressure sensitive epoxy or adhesive, are quickly broken to release the two mating components of the epoxy or adhesive and generate the desired bond between the mating surfaces of the folded form.

It is to be appreciated that the folding and sealing apparatus of the present invention could also be used only to fold forms, i.e., used as a standard folder, rather than to both fold and seal forms if an insufficient sealing pressure is applied to the folded form to release and mix the encapsulated glue or if standard paper, without any glue, is passed through the folding and sealing apparatus.

To assist with feeding the supply of pre-glued forms 1, to be folded, to the folding and sealing apparatus 40 (FIGS. 5 and 7), the feed platform 58 has a pair of spaced apart feed belts 104, supported by a pair of spaced apart shafts 106 (only one of which is shown). One of the shafts supports a first pulley 108 and the second roller 52 supports a mating second pulley 110. A drive belt 112 rotates around the pair of pulleys 108, 110 to supply rotational drive from the second gear 68 to the pair of pulleys in a conventional manner. By this arrangement, the pair of spaced apart rotatable belts 104 rotate along with the first and second rollers 50 and 52 to assist with sequentially feeding the supply of pre-glued forms 1 to be folded one after another through the first nip 51.

The feed platform 58 also has a centrally located form retarder device 114, preferably manufactured from DELRIN® or some other similar material, to facilitate supplying only one pre-glued form 1 at a time to the first nip 51. The form retarder device 114 is fixed support by a first cross bar 116, located adjacent the feed platform 58, while a second reinforced cross bar 118 is spaced further from the feed platform 58 than the first cross bar 116. The second reinforced cross bar 118 supports a thread member 120 located to engage with a rear surface of the first cross bar 116 facing away from the feed platform 58 and exert pressure thereon.

As pressure is applied to the first cross bar 116, via the thread pressure member 120 of the second reinforced cross bar 118, the first cross bar 116 starts to bow and gradually move the supported form retarder device 114 toward the feed platform 58 thereby reducing the clearance between the form retarder device 114 and a top surface of the feed platform 58. Alternatively, if the pressure applied to the first cross bar 116, via the thread pressure member 120 of the second reinforced cross bar 118, is decreased, the first cross bar 116 then moves back toward its unstressed condition and gradually moves the form retarder device 114 away from the top surface of the feed platform 58 thereby increasing the clearance between the form retarder device 114 and the top surface of the feed platform 58.

Figure 13:
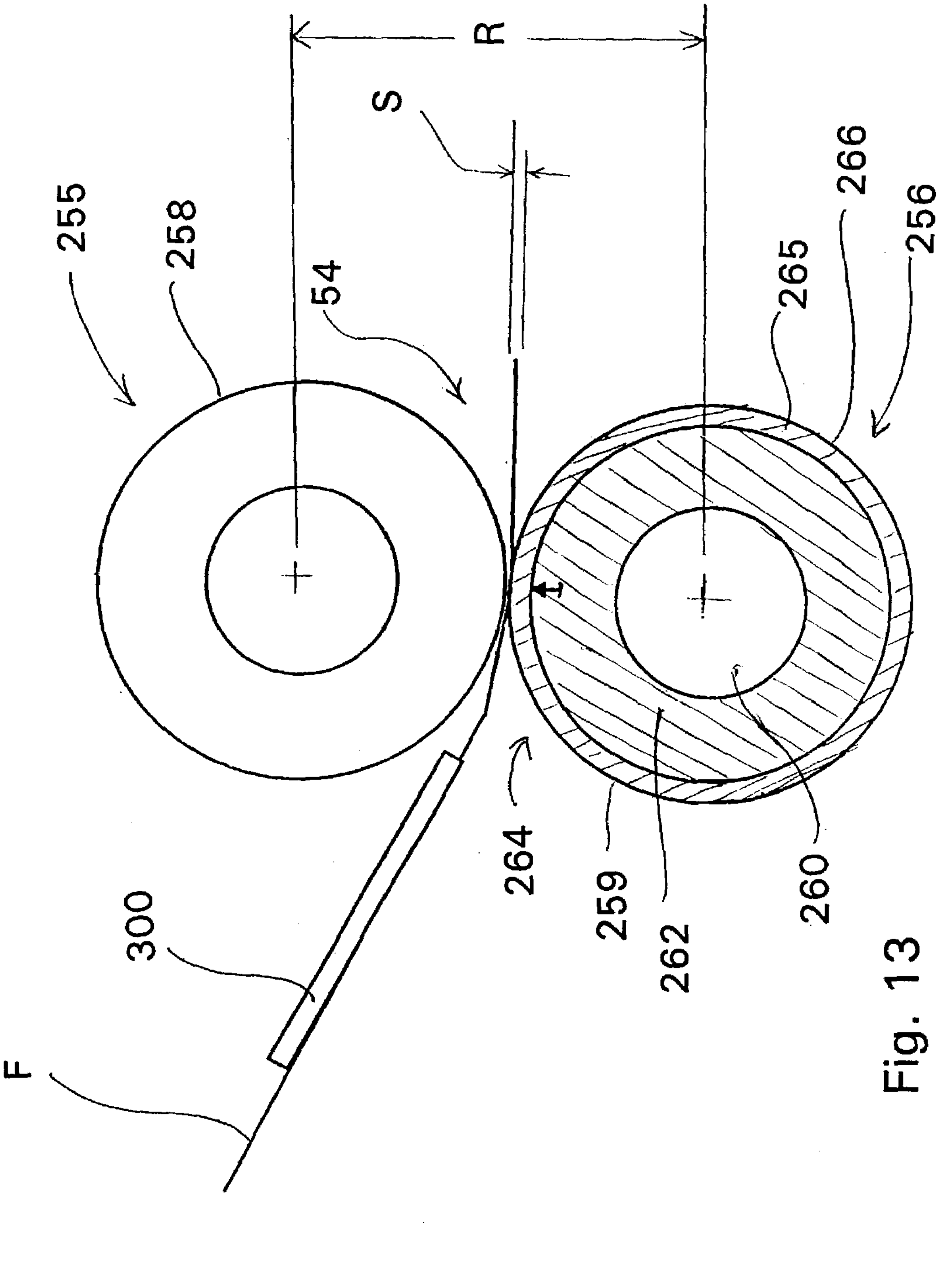
FIG. 13 is a diagrammatic cross-sectional view of a nip of the folding and sealing apparatus formed by a pair of rollers, with one roller having a compressible portion.

One problem associated with the conventional rollers, and known folding and sealing apparatus, is the difficulty inherent with folding and sealing paper having a thicker object or items attached to the paper, for example a credit card or business-type card, e.g. laminated insurance or health care provider cards. In another embodiment of the present invention described below and shown in FIGS. 13–19, at least a compressible or resilient roller is used to facilitate the passing of such an item through the relatively narrow nips to alleviate occurrences of binding of the rollers. One or more rollers, generally at least one roller per pair of rollers, or nip, of the previously described rollers 50, 52, 54 and 56 in the folding and sealing apparatus 40 can be provided with a circumferential resilient or compressible portion, or portions, to facilitate the passing of a bulky object between rollers. For purposes of discussion only, a pair of rollers 255, 256 are shown in FIG. 13 and described below with the lower roller 256 in the figure being a resilient or compressible roller.

In general, a bulky object or item to be attached to a piece of paper or form will be relatively thin, in the range of about 0.01 to 0.05 of an inch, which is generally thicker than paper used for the forms. The form paper having a general thickness in the range of about 0.001 to 0.01 of an inch, and usually about 0.007 of an inch. For example, a credit card 300, or cards, having a thickness about 0.03 of an inch, or a business card, i.e., an insurance or health care card, is often attached to the paper form F to be folded and sealed between the rollers of the above described apparatus 40.

It is to be appreciated that any number of cards could be supported on the paper form. By way of example a health care company might send four (4) family members their health insurance cards all mounted on the same form. It is to be appreciated that as the form is folded by the apparatus, adjacent cards mounted on the form might overlap, i.e., be stacked on top of one another as the form is folded into for instance, a c-fold or a z-fold as is known in the art, thus essentially doubling, or even tripling the thickness of the cards and paper which must pass through a nip. The compressible portion(s) 264 of the roller 256 are designed to accommodate such thicker, bulkier objects while maintaining sufficient resilience to ensure proper sealing of the form is accomplished.

In accordance with previous discussion, the adjacent rollers 255, 256 are provided with a fixed spacing S therebetween forming the nip of about 0.004±0.005 of an inch to permit a piece of paper, form F, or folded form, to pass there between. This fixed spacing S can range at least between about 0.001 and 0.01 of an inch depending upon the application. However in the case of an additional bulky object such as a credit card 300, or stacked cards as described above, with such relatively narrow fixed spacing S between the surfaces of the rollers, and the substantially radially fixed nature of the rollers 255, 256, it is readily apparent to anyone of skill in the art that the attempt to pass an additional bulky item through the narrow nip could jam the rollers 255, 256 and the apparatus, or in the alternative, crush the card 300 and/or ruin, crease or line the supporting form.

Adjustment of the radial spacing R between adjacent rollers 255, 256 is generally not advantageous to permitting a bulky item to pass, since merely enlarging the overall radial spacing R, and consequently the nip spacing S, between the rollers 255, 256 would not provide the desired folding and sealing of the form. It is therefore desirable to retain the fixed radial spacing R, and consequently the nip spacing S between the outer surface 258 of the first roller, and the outer surface 259 of the second roller, and to provide as described in greater detail below, at least a portion 264 of the roller surface to be resilient or compressible to facilitate the passage of a bulky item applied or attached to the form F between the rollers 255, 256.

By way of example, and not intended to be limited hereto, the following description is provided with the application of a credit card 300 onto a form F, prior to the form F being folded and sealed by the apparatus. Prior to folding and sealing of the form F, the credit card 300 is usually attached to the unfolded form F at a desired location by any method known in the art, for instance by application of contact adhesive between the credit card 300 and form F. Once the credit card 300 is supported on the form F, the form F and credit card 300 may be supplied to the apparatus for folding and sealing. It should be apparent to one of skill in the art that numerous other items of any size and bulk could be applied to the form F but for purposes of discussion a credit card 300 having the general dimensions of about 3 inches by 2 inches, and being about .03 inches in thickness is utilized.

Observing FIG. 13, in order to accommodate the relatively bulky credit card 300 in combination with the form F through the apparatus, at least the second roller 256 is a compressible roller. The compressible roller 256 itself is generally comprised of a roller core shaft 260 by which the roller is supported. The core shaft 260 has a length L along which the core shaft 260 may be of constant cylindrical proportions, or the core shaft 260 can have portions of differing diameter. The core shaft 260 can be made of metal or plastic or any other suitable material as is known in the art. The core shaft 260 supports along at least a portion of the length L thereof a resilient intermediate layer 262 which can be formed from known urethane or rubber materials. The resilient layer 262 may be divided into resilient different portions 264 along the length L to accommodate separate cards mounted on the form F. Finally, a surface or sleeve cover 265 may encompass the intermediate layer 262 and an outer surface covering material 266 may be provided to the compressible roller 256 for directly contacting the form F to be folded and sealed.

Figure 14:
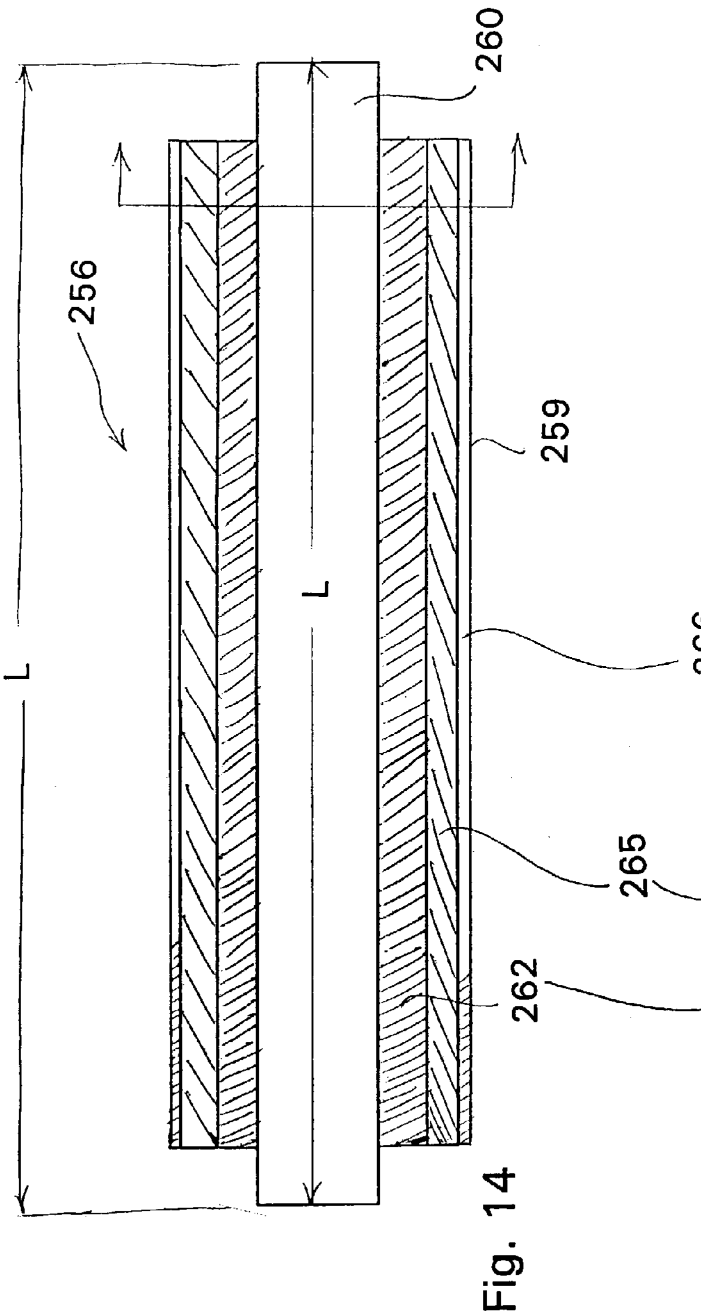
FIG. 14 is a partial longitudinal cross-sectional view of the compressible roller having the resilient layer.
Figure 15:
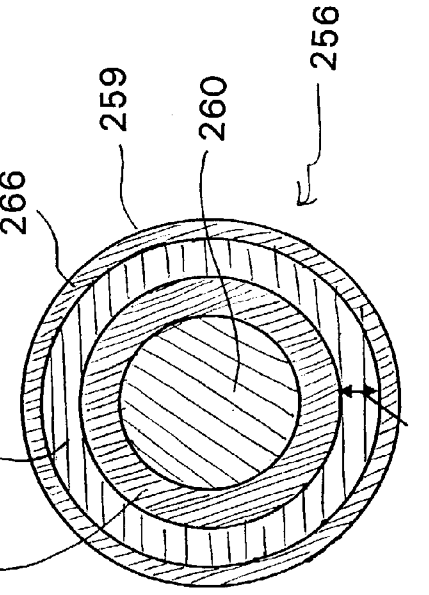
FIG. 15 is an axial cross-sectional view of the compressible roller along line 15—15 of FIG. 14.
Figure 16:
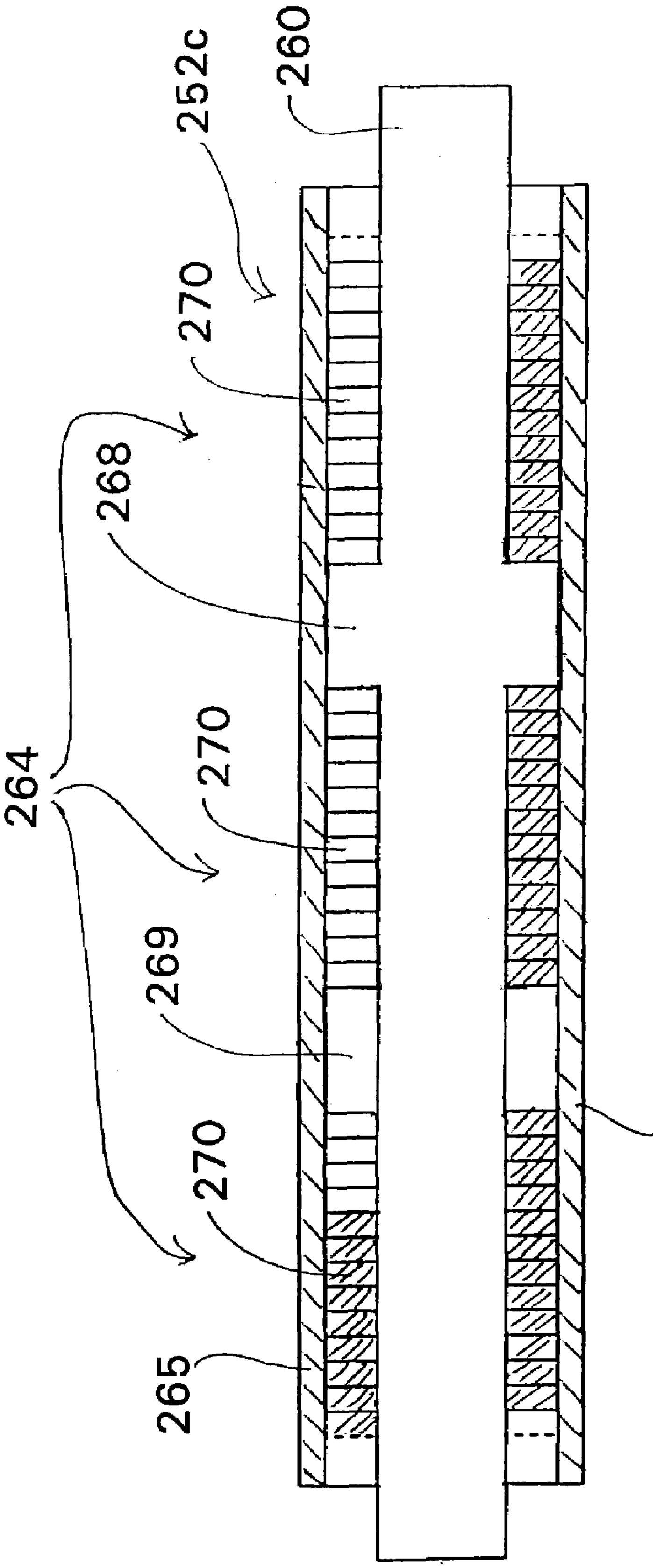
FIG. 16 is a partial longitudinal cross-sectional view of another embodiment of the compressible roller having the resilient layer formed from O-rings spaced into several sections by portions of the shaft.

The embodiment of FIGS. 14, 15 show mainly a single lengthwise intermediate resilient layer 262 circumferentially extending substantially the length of the core shaft 260. FIG. 16 shows a number of separate, or axially spaced apart portions 264 of the resilient intermediate layer 262, each portion 264 shown composed of adjacent O-rings 270 provided along certain lengths of the core shaft 260. Spaces between separate resilient intermediate portions 264 may be composed of larger diameter sections 268 of the core shaft 260, or in the alternative, separate intermediate substantially non-resilient rings 269 supported by the core shaft 260. Finally, the exterior sleeve cover 265 is provided over the intermediate layer 262(s). The sleeve cover 265 can be made from urethane, rubber or even metal as is known in the art and may be a single sleeve, or may be divided into individual axial adjacent sleeves wherein the axial length of the individual sleeve corresponds to the underlying resilient intermediate layer 262 to define the resilient or compressible circumferential portion 264 of the compressible roller as shown in FIGS. 17 and 18.

Figure 17:
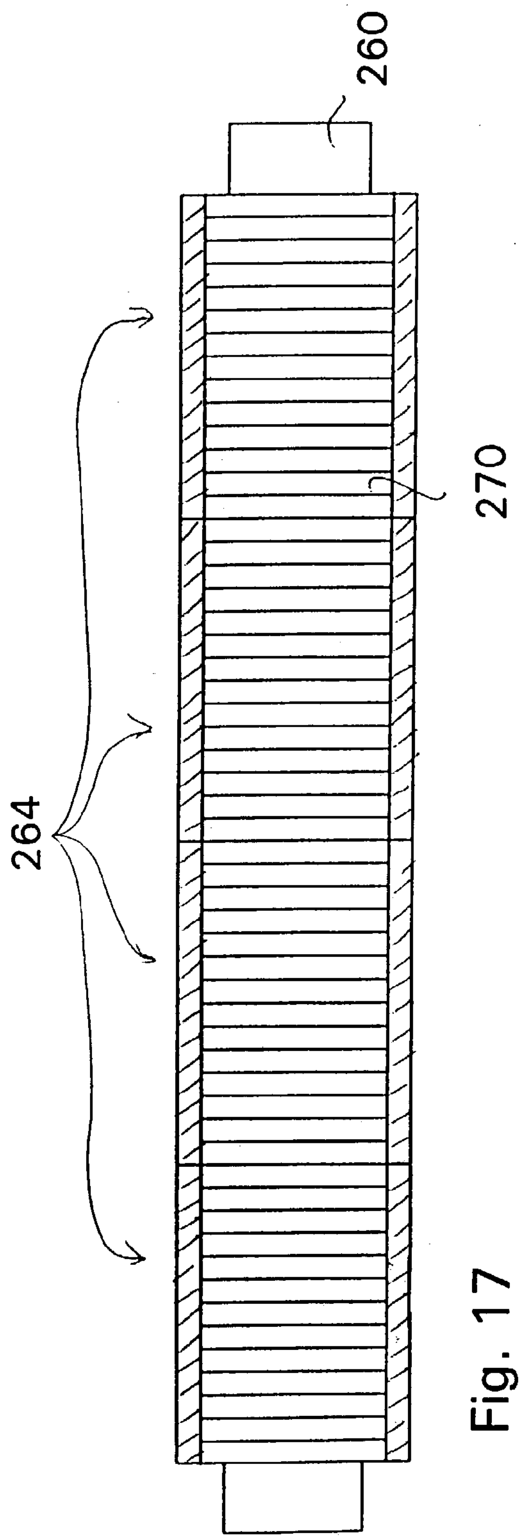
FIGS. 17 and 18 are partial longitudinal cross-sectional views of the compressible roller having the resilient layer formed from O-rings and a sleeve cover of the O-rings divided into several sections to define compressible portions of the rollers.
Figure 18:
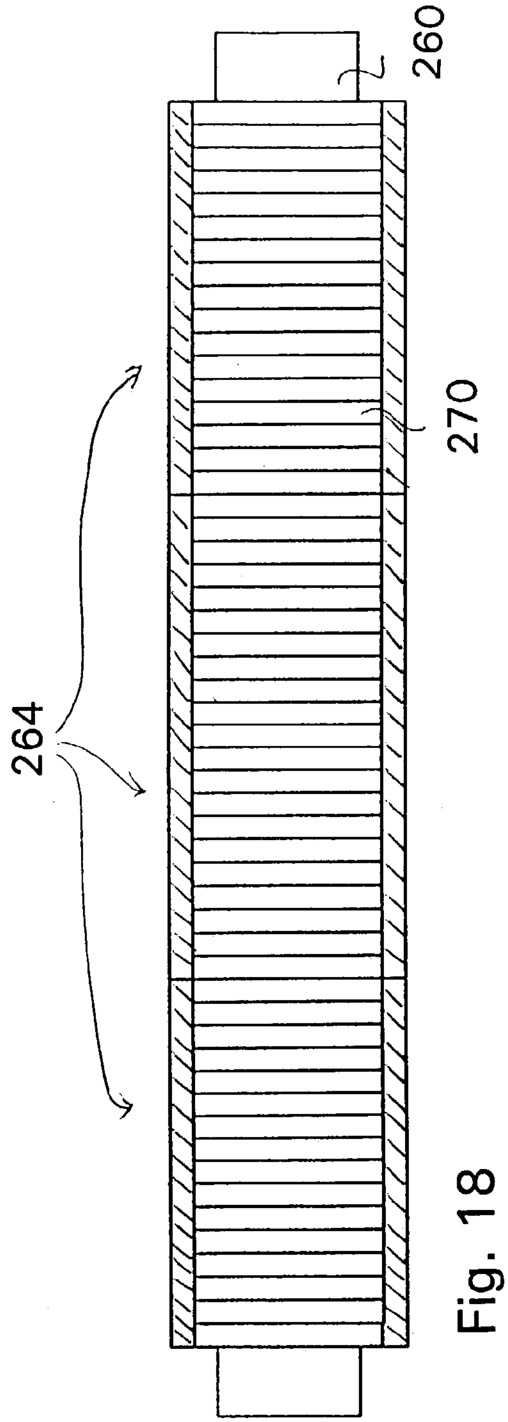

In the embodiment of the present invention shown in FIGS. 16–18, the intermediate resilient layer 262 of the roller is formed from a plurality of adjacent O-rings 270 fabricated from a resilient urethane or rubber material. Each of the O-rings 270 define an inner diameter substantially matching an outer diameter of a section of the core shaft 260 about which the O-rings 270 are to be supported, and an outer diameter of the O-rings 270 is usually just less then the desired outer diameter of the surface of the roller. The number of O-rings 270 provided along the length of the subcore shaft 260 is variable depending upon the size and orientation of the bulk item to be passed through the nips. For example, a credit card 300 mounted lengthwise across the 8½ inch width of a typical form F would thus require a compressible portion 257 on the roller be made up of a sufficient number of O-rings 270 to span about 3 inches along the length L of the roller to accommodate the passage of the card 300 and the form F through the nip. The embodiments shown in FIGS. 16–18 can thus facilitate the passage of at least 1–4 credit cards mounted across the form F The sleeve cover 265 is usually a rubber, urethane or metal sleeve radially supported by and surrounding the outer diameter of the O-rings 270 to form a displaceable resilient portion 264 of the roller. The sleeve cover 265 has a wall thickness of about 0.06 to 0.250 inches dependent upon the material, sufficient to maintain the outer surface 259 at a constant diameter in an unbiased state when only the paper form F is passed through the nip. In a biased or displaced state where the credit card 300 is passed through the nip, the sleeve 265 is flexible to the extent that the sleeve is radially displaced due to the resilience of corresponding underlying resilient O-rings 270. In general the remainder of the outer surface of the roller not displaced by the passage of the credit card 300 is, therefore, not compressed and thus facilitates the folding and passage of the form F.

Figure 19:
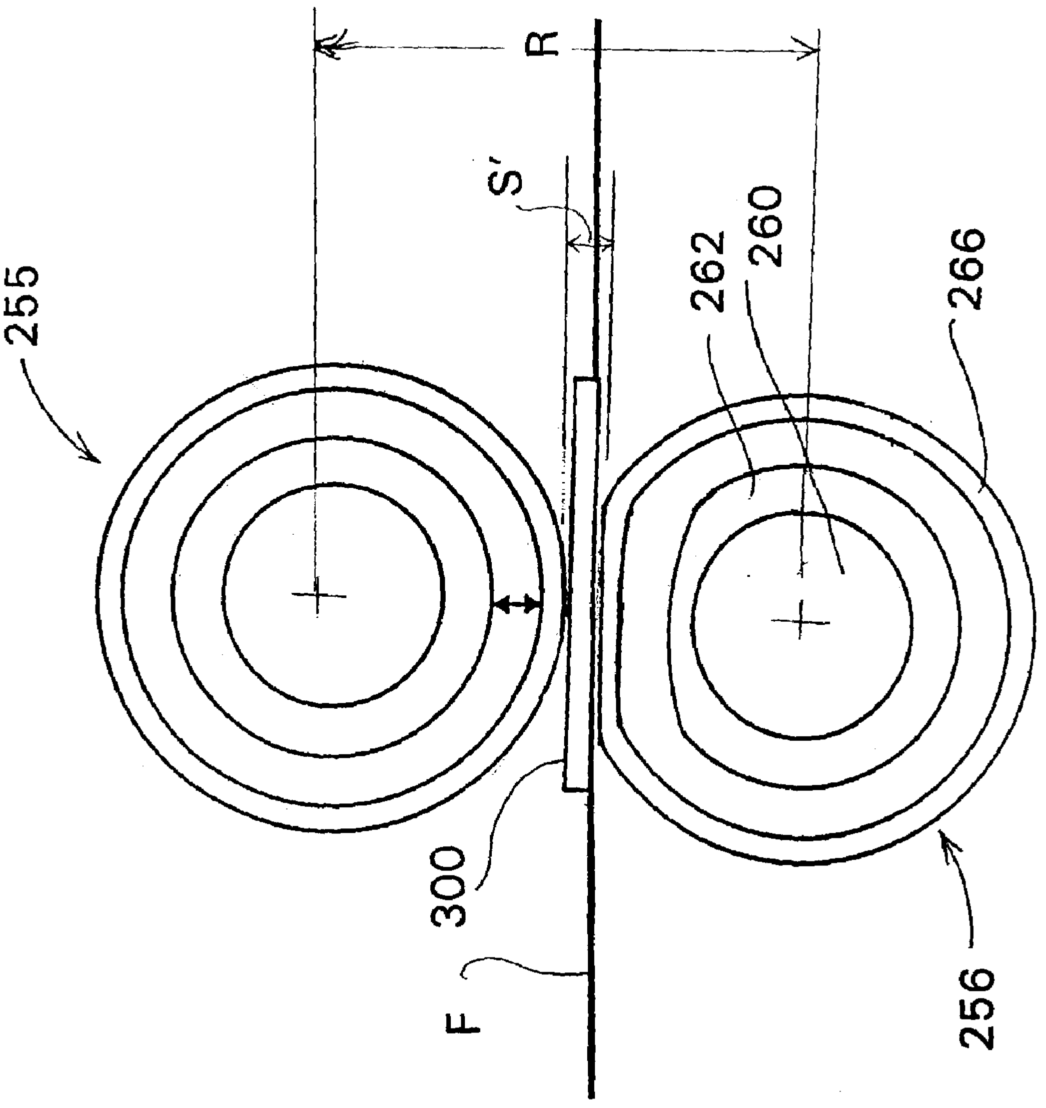
FIG. 19 is a diagrammatic cross-sectional view of a nip of the folding and sealing apparatus formed by a pair of rollers, with one roller having a compressible portion and a form carrying an item passing through the nip.

Turning now to FIG. 19, and with reference back to FIG. 13, the credit card 300 having been affixed to the center of a standard 8 ½x11 inch letter size form F is shown passing through a nip between a first and second roller 255, 256. The second roller 256 is provided with a resilient circumferential layer 262 as discussed above to accommodate the credit card 300 and form F. In general, a leading edge of the form F enters the nip between the two rollers 255, 256 maintaining a substantially constant spacing S as shown in FIG. 13 between the opposing outer surfaces 258, 259 of the first and second rollers 255, 256. Once the portion of the form F supporting the credit card 300 enters the nip, as seen in FIG. 19, the resilient circumferential portion 264 of the first roller radially compresses to the extent necessary to allow the credit card 300 to pass therethrough and consequently causes the modified nip spacing S' in the contact area with the credit card 300. Because the resilient circumferential layer 262 of the second roller 265 is compressed mainly in the general contact area with the credit card 300, i.e., usually the resilient portion 264 as defined along the length of the roller 256, the remainder of the nip maintains the constant spacing S to provide for passage of solely the form F, or folded form F therethrough.

Once the credit card 300 has passed through the nip, the springiness of the resilient compressible portion 264 of the second roller ensures the sleeve cover 265 rebounds from the modified spacing S' back to the spacing S between first and second roller surfaces 258, 259. It is also readily apparent to one of skill in the art that the two adjacent rollers 255, 256 may each be provided with adjacent compressible portions 264 to mutually absorb a portion of the bulk item passing therethrough. However, as shown above, it is usually necessary that either the first or second of the adjacent rollers 255, 256 have a resilient compressible portion 264 so that sufficient rolling and compression forces are maintained not only across the form F, for purposes of folding and sealing the form F, but also the form portion supporting the credit card 300.

It is to be appreciated that for every pair of rollers 255, 256, i.e., for every nip formed by adjacent rollers 255, 256, one of the rollers must be provided with one or more resilient compressible portions 264 so that the credit card 300, or cards, can pass through the entire apparatus with appropriate folding and without jamming a pair of rollers. By way of example in a roller and apparatus system as shown in FIG. 6 having four rollers defining 3 nips, generally where the first roller is a feed assist, the second and fourth rollers are provided with the compressible portion 264. Such arrangement would align one compressible roller 256 at each of the 3 nips. When the credit card 300 and form F are in the nip the pressure generated at the area of contact, i.e., the compressible portion 264, by the thickness of the credit card 300 compresses the O-rings 270 which allows the sleeve cover 265 and resilient layer 262 to displace relative to the outer surface of the adjacent roller. Thus, the relative radial distance R between the rollers 255, 256 remains the same despite permitting the credit card 300 to pass through each nip in the apparatus.

It is to be appreciated that a in an application where a number of credit cards 300 or other bulky objects are applied to the form F and passed through the apparatus, the surface cover 265 may be divided into any number of separate sections in order to individually provide passage of appropriately aligned items independent of the remainder of the sleeve cover sections. The embodiments shown in FIG. 17 shows a compressible roller having four separate sleeve cover sections although substantially any number could be used. Additionally, the sleeve cover 265 corresponds along the length L of the roller to a specified number of O-rings 270 forming the intermediate layer 262, in order words, each sleeve section is supported an independent number or section of the intermediate layer 262 which thus allows that intermediate layer 262 section and the associated sleeve section to move independently of the remainder of the sleeve sections and to be displaceable independent of the remainder of the roller.

Figure 20:
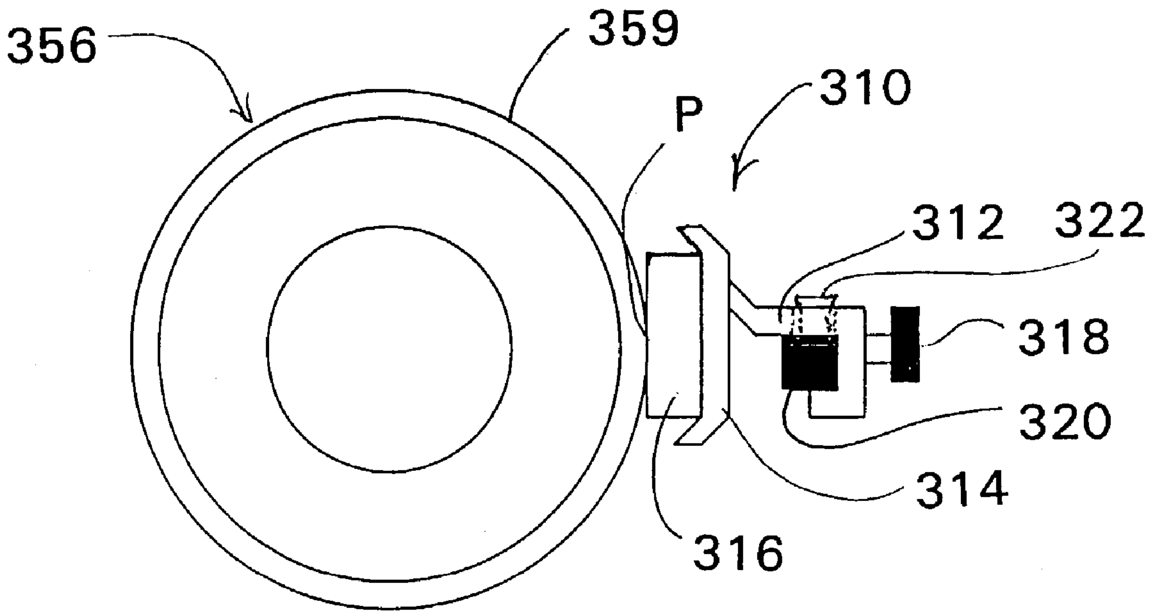
FIG. 20 is an axial cross section of a roller having an adjacent cleaning or wiping arm for removing debris from the rollers of the folding and sealing apparatus.

In another advantageous embodiment of the present invention as shown in FIG. 20, a sweeper or wiper cleaning arm 310 may be provided adjacent and contacting, i.e., grazing, any one of the rollers 53, 54, 55, 56, 255, 256 and for purposes of this embodiment roller 356, of the present invention to provide for removal of certain debris from these rollers. During operation of the apparatus, the surfaces of the rollers may accumulate such debris as: paper particles, dust, glue or even excess toner which falls off the paper when the diffuser becomes to hot.

The cleaning arm 310 need generally only be provided to graze one of the rollers, for purposes of illustration herein roller 356, as the debris tends to travel between all the rollers in the apparatus due to their relative proximity and corresponding rotation.

The cleaning arm 310 comprises an adjustable support 312 carrying a cleaning brush or pad 316. The pad 316 is provided having a longitudinal length corresponding to the axial length of the roller surface and a width of only a relatively small portion of the circumference of the roller. Thus, the brush or pad comes into linear contact with the entire circumferential surface along the length of the roller surface 359 as the roller 356 rotates relative to the axially parallel supported cleaning arm 310 and brush or pad 316. The arm 310 is made of metal or plastic or other relatively sturdy material and is provided with a brush holding portion 314 along a longitudinal axis thereof, usually a channel into which the brush or pad 316 for collecting debris can be inserted and removed therefrom. The brush or pad 316 may be made of any substantially dust, grit, ink or toner collecting material. In a preferred embodiment the collecting material is for example felt, which can rub lightly against the roller to collect micro- and macroscopic debris without substantially impairing the free rotation of the roller 356.

By way of example, the arm 310 can be positioned adjacent the roller 356 on a support 320 of the apparatus, and the arm 310 is provided with at least a radial adjustment screw 318. This radial adjustment screw 318, or screws, can be used to adjust the relative radial alignment, i.e., the spacing, between the longitudinal axis of the cleaning arm relative to the longitudinal axis of the roller 356. This radial alignment permits the pad or brush to be moved closer to, or farther away from the surface 359 of the roller 356. It is to be appreciated that the support 320 may also be adjustable relative to the roller 356

The arm 310 may be further provided with a set screw 322 which upon the proper radial adjustment as well as longitudinal alignment between the cleaning arm 310 and the roller surface 359, the set screw 322 may be tightened to restrict relative movement between the roller 356 and the cleaning arm 310.

Since certain changes may be made in the above described improved folding and sealing apparatus, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A folding and sealing apparatus comprising:
- a housing;
- the housing accommodating a plurality of rollers;
- the housing accommodating a motor for driving at least one of the plurality of rollers via a drive mechanism;
- a feed surface, supported by the housing, for feeding a supply of pre-glued forms to the folding and sealing apparatus;
- at least two nips formed by the plurality of rollers each nip having a nip clearance and the two nips provide a sufficient sealing pressure to the folded pre-glued form, as the pre-glued form passes through the two nips, to facilitate both folding and sealing of the pre-glued form as the folded pre-glued form passes through the two nips;
- at least one of the plurality of rollers comprises an intermediate resilient layer and an outer layer to facilitate passage of an object mounted to the pre-glued form through the at least two nips;
- the intermediated resilient layer elastically supports at least a section of the outer layer to define a variable size nip enabling the passage of a thicker article relative to the pre-glued form; and
- wherein the outer layer extends flush along the length of the roller and the intermediate resilient layer comprises a plurality of immediately adjacent resilient O-rings at least partially supporting the outer layer along the length of the roller.

2. The folding and sealing apparatus according to claim 1, wherein the plurality of rollers comprise a first roller, a second roller, a third roller and a fourth roller, and the first roller, the second roller, the third roller and the fourth roller forming a first nip, a second nip and a third nip and at least the second roller and the fourth roller are provided with respective resilient surface portions.

3. The folding and sealing apparatus according to claim 2, wherein a collection bin is provided adjacent an outlet of the third nip for collecting the folded and sealed forms upon exiting from the folding and sealing apparatus and an axially and radially adjustable cleaning arm is provided in contact along a length of at least one of the plurality of rollers for removing debris from the surface of the roller.

4. The folding and sealing apparatus according to claim 2, wherein a single motor drives one of the first, the second, the third and the fourth rollers so that the second and fourth rollers rotate in a clockwise direction while the first roller and the third roller rotate in a counterclockwise direction.

5. The folding and sealing apparatus according to claim 4, wherein the first and second rollers are arranged to form a first nip, the second and third rollers are arranged to form a second nip, and the third and fourth rollers provide a third nip.

6. The folding and sealing apparatus according to claim 2, wherein the first roller, the second roller, the third roller and the fourth roller all have the same diameter and are all geared to rotate, during operation, at the same rotational speed.

7. The folding and sealing apparatus according to claim 6, wherein the first roller, the second roller, the third roller and the fourth roller all have a diameter of between about 1 inch to about 3 inches and the first roller, the second roller, the third roller and the fourth roller all rotate at a rotational speed of between 40 to about 1200 revolutions per minute.

8. The folding and sealing apparatus according to claim 2, wherein the first roller is spring biased toward the second roller to form the first nip which is a spring biased nip;
- the second roller, the third roller and the fourth roller are all fixedly mounted rollers; and
- the second roller and the third roller form a fixed second nip and the third roller and the fourth roller form a fixed third nip.

9. The folding and sealing apparatus according to claim 8, wherein a first spiring provides a force for biasing the first roller toward the second roller, and a tension of the first spring is adjustable to adjust the biasing force of the first roller.

10. The folding and sealing apparatus according to claim 8, wherein a first fold channel tray is located between the first nip and the second nip to assist with forming a first fold in the pre-glued form, and the first fold channel tray has an adjustable fold stop for adjusting a first fold length to be made in the pre-glued form during operation of the folding and sealing apparatus; and
- a second fold channel tray is located between the second nip and the third nip to assist with forming a second fold in the pre-glued form, and the second fold channel tray has an adjustable fold stop for adjusting a second fold length to be made in the pre-glued form during operation of the folding and sealing apparatus.

11. The folding and sealing apparatus according to claim 10, wherein at least the second fold channel tray is releasably secured to the housing to facilitate reversal thereof.

12. The folding and sealing apparatus according to claim 10, wherein both the first and the second fold channel trays are releasably secured to the housing to facilitate reversal thereof.

13. The folding and sealing apparatus according to claim 8, wherein the second roller, the third roller and the fourth roller each have a stainless steel exterior surface to facilitate sealing of the folded form as the folded form passes through the second nip and the third nip.

14. The folding and sealing apparatus according to claim 2, wherein a conveyor is provided adjacent an outlet of the third nip for collection of the folded and sealed pre-glued forms upon exiting from the folding and sealing apparatus and conveying the folded and sealed form for further processing.

15. A folding and sealing apparatus comprising:

a housing accommodating a plurality of rollers defining at least two nips for folding and sealing a pre-glued form passed through the apparatus;

at least a first roller of said plurality of rollers having an intermediate resilient layer and a sleeve to accommodate the passage of an object larger than a nip spacing fastened to the pre-glued form through the at least two nips;

at least the first and a second roller of the plurality of the rollers are axially fixed with respect to one another to provide a sufficient sealing pressure to the folded pre-glued form, as the pre-glued form passes through the two nip spacings, to facilitate both folding and sealing of the pre-glued form as well as permit passage of the object through the nips; and wherein the sleeve extends the length of the first roller and the intermediate resilient layer of the first roller comprises a plurality of immediately adjacent resilient O-rings at least partially supporting the sleeve along the length of the roller.

16. The folding and sealing apparatus according to claim 15 wherein the sleeve of the roller comprises a plurality of individual sections wherein at least one of the sections is elastically supported by the plurality of O-rings.

17. The folding and sealing apparatus according to claim 16 wherein the at least one of the sleeve sections is non-elastically supported on the core of the roller.

18. A folding and sealing apparatus comprising:

a housing accommodating a plurality of rollers defining at least two nip spacings extending the length of the rollers for folding and sealing a pre-glued form passed through the apparatus;

at least a first roller of said plurality of rollers comprising;

a core supporting an intermediate resilient layer comprising a plurality of immediately adjacent resilient O-rings;

a sleeve supported by said plurality of immediately adjacent resilient O-rings defining a flush outer surface of the first roller; and wherein at least the first and a second roller of the plurality of the rollers are axially fixed with respect to one another, and the outer surface of the first roller extends substantially the length of the roller to provide a sealing pressure along the entire length and width of the folded pre-glued form engaging the first roller to facilitate both folding and sealing of the pre-glued form.

* * * * *